(12) United States Patent
Karagiannis et al.

(10) Patent No.: US 10,632,723 B2
(45) Date of Patent: *Apr. 28, 2020

(54) POLYVINYL ACETAL AND CELLULOSE ESTER MULTILAYER INTERLAYERS

(71) Applicant: Solutia Inc., St. Louis, MO (US)

(72) Inventors: Aristotelis Karagiannis, Amherst, MA (US); Bruce Edward Wade, West Springfield, MA (US); Khanh D. Tran, South Hadley, MA (US); Michael Eugene Donelson, Kingsport, TN (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,534

(22) Filed: May 10, 2019

(65) Prior Publication Data
US 2019/0263094 A1 Aug. 29, 2019

Related U.S. Application Data

(63) Continuation of application No. 14/958,232, filed on Dec. 3, 2015, now Pat. No. 10,293,578.

(60) Provisional application No. 62/088,841, filed on Dec. 8, 2014.

(51) Int. Cl.
| | |
|---|---|
| *B32B 17/08* | (2006.01) |
| *B32B 27/06* | (2006.01) |
| *B32B 23/20* | (2006.01) |
| *B32B 23/08* | (2006.01) |
| *C08L 1/10* | (2006.01) |
| *C08L 1/14* | (2006.01) |
| *B32B 17/10* | (2006.01) |
| *C08K 5/00* | (2006.01) |
| *C08K 5/1539* | (2006.01) |
| *B32B 27/30* | (2006.01) |
| *B32B 7/02* | (2019.01) |
| *B32B 27/22* | (2006.01) |

(52) U.S. Cl.
CPC ........ *B32B 17/10761* (2013.01); *B32B 17/08* (2013.01); *B32B 17/10688* (2013.01); *B32B 27/06* (2013.01); *C08K 5/0016* (2013.01); *C08K 5/1539* (2013.01); *C08L 1/10* (2013.01); *C08L 1/14* (2013.01); *B32B 7/02* (2013.01); *B32B 23/08* (2013.01); *B32B 23/20* (2013.01); *B32B 27/22* (2013.01); *B32B 27/306* (2013.01); *B32B 2250/03* (2013.01); *B32B 2250/40* (2013.01); *B32B 2307/412* (2013.01); *B32B 2307/42* (2013.01); *B32B 2307/544* (2013.01); *B32B 2307/546* (2013.01); *B32B 2307/56* (2013.01); *B32B 2307/71* (2013.01); *B32B 2307/732* (2013.01); *B32B 2419/04* (2013.01); *B32B 2551/00* (2013.01); *B32B 2571/02* (2013.01); *B32B 2605/006* (2013.01); *B32B 2607/02* (2013.01)

(58) Field of Classification Search
None
See application file for complete search history.

(56) References Cited

U.S. PATENT DOCUMENTS

| | | | |
|---|---|---|---|
| 1,683,347 | A | 9/1928 | Gray et al. |
| 1,698,049 | A | 1/1929 | Clarke et al. |
| 1,880,560 | A | 10/1932 | Webber |
| 1,880,808 | A | 10/1934 | Clarke et al. |
| 1,984,147 | A | 12/1934 | Malm |
| 2,067,310 | A | 1/1937 | Auden |
| 2,129,052 | A | 9/1938 | Fordyce |
| 2,231,818 | A | 2/1941 | Rodman et al. |
| 2,282,026 | A | 5/1942 | Bren et al. |
| 2,282,057 | A | 5/1942 | Hopkins et al. |
| 3,617,201 | A | 11/1971 | Berni et al. |
| 3,762,981 | A | 10/1973 | Blank |
| 4,009,030 | A | 2/1977 | Abel |
| 4,029,849 | A | 6/1977 | Abel |
| 4,952,457 | A * | 8/1990 | Cartier .............. B32B 17/10018 428/425.6 |
| 4,968,745 | A | 11/1990 | Misra et al. |
| 5,137,954 | A | 8/1992 | DasGupta et al. |
| 5,728,472 | A | 3/1998 | D'Errico |
| 6,461,718 | B2 | 8/2002 | Mori |
| 6,825,255 | B2 | 11/2004 | Yuan et al. |
| 7,883,761 | B2 | 2/2011 | Bourcier et al. |
| 7,901,780 | B2 | 3/2011 | Chen et al. |
| 8,399,098 | B2 | 3/2013 | Bennison et al. |
| 10,293,577 | B2 | 5/2019 | Karagiannis et al. |
| 10,293,578 | B2 * | 5/2019 | Karagiannis ............ B32B 17/08 |
| 10,364,345 | B2 | 7/2019 | Karagiannis et al. |
| 2001/0006451 | A1 | 7/2001 | Miyazaki et al. |
| 2001/0023009 | A1 | 9/2001 | Mori |
| 2003/0161997 | A1 | 8/2003 | Moran |
| 2007/0009714 | A1 | 1/2007 | Lee et al. |
| 2010/0129665 | A1 | 5/2010 | Chou |
| 2012/0297964 | A1 | 11/2012 | Carberry et al. |
| 2013/0236693 | A1 | 9/2013 | Lu |
| 2013/0236711 | A1 | 9/2013 | Lu |
| 2014/0092468 | A1 | 3/2014 | Takamuki |
| 2016/0159044 | A1 | 6/2016 | Karagiannis et al. |
| 2016/0159045 | A1 | 6/2016 | Karagiannis et al. |
| 2016/0160031 | A1 | 6/2016 | Karagiannis et al. |

OTHER PUBLICATIONS

Copending U.S. Appl. No. 14/957,890, filed Dec. 3, 2015, Karagiannis et al.

(Continued)

*Primary Examiner* — Sheeba Ahmed
(74) *Attorney, Agent, or Firm* — Steven A. Owen

(57) ABSTRACT

A multilayer interlayer structure having a first and second polyvinyl acetal (poly(vinyl acetal)) layer and a cellulose ester layer having a thickness of at least 10 mils disposed between the first and second poly(vinyl acetal) layers. The cellulose ester layer can have a higher storage modulus and/or higher Tg than at least one of the poly(vinyl acetal) layers. The interlayer structure is useful to make glass panels having high stiffness and which possess good optical clarity for a variety of applications, including outdoor structural applications.

9 Claims, No Drawings

(56) References Cited

OTHER PUBLICATIONS

PCT International Search Report and Written Opinion dated Mar. 22, 2016 for International Application No. PCT/US2015/063904.
PCT International Search Report and Written Opinion dated Mar. 17, 2016 for International Application No. PCT/US2015/063883.
Kirk-Othmer, Encyclopedia of Chemical Technology, $5^{th}$ Edition, vol. 5, Wiley-Interscience, New York (2004), pp. 394-444.
Wade, B.E., Vinyl Acetal Polymers, in Encyclopedia of Polymer Science & Technology, $3^{rd}$ edition, vol. 8, pp. 381-399 (2003).
Office Action dated Oct. 5, 2017 received in co-pending U.S. Appl. No. 14/957,890.
Office Action dated May 10, 2018 received in co-pending U.S. Appl. No. 14/957,890.
Office Action dated Dec. 20, 2018 in co-pending U.S. Appl. No. 14/957,890.
Copending U.S. Appl. No. 16/408,521, filed May 10, 2019, Karagiannis et al.
Office Action dated Aug. 8, 2019 in co-pending U.S. Appl. No. 16/408,521.

* cited by examiner

POLYVINYL ACETAL AND CELLULOSE ESTER MULTILAYER INTERLAYERS

CROSS REFERENCE TO RELATED APPLICATIONS

This application is a continuation application of U.S. patent application Ser. No. 14/958,232 filed Dec. 3, 2015 now U.S. Pat. No. 10,293,578 which claims priority to U.S. Provisional Application Ser. No. 62/088,841 filed Dec. 8, 2014, the disclosures of which is herein incorporated by reference in its entirety.

FIELD OF THE INVENTION

The present invention relates to multilayer poly(vinyl acetal) interlayers, and more particularly to multilayer poly(vinyl acetal) interlayers containing a cellulose ester interlayer to increase the stiffness of the multilayer interlayer.

BACKGROUND OF THE INVENTION

Generally, multiple layer glass panels refer to a laminate comprised of a multilayer interlayer or interlayer sandwiched between two panes of glass. The laminated multiple layer glass panels are commonly utilized in architectural window applications, in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, keep the layers of glass bonded even when the force is applied and the glass is broken, and prevent the glass from breaking up into sharp pieces. Additionally, the interlayer generally gives the glass a much higher sound insulation rating, reduces UV and/or IR light transmission, and enhances the aesthetic appeal of the associated window.

The interlayer is generally produced by mixing a polymer resin such as poly(vinyl acetal) with one or more plasticizers and melt blending or melt processing the mix into a interlayer by any applicable process or method known to one of skill in the art, including, but not limited to, extrusion. Other additional additives may optionally be added for various other purposes. After the multilayer interlayer is formed, it is typically collected and rolled for transportation and storage and for later use in the multiple layer glass panel, as described below.

The following offers a simplified description of the manner in which multiple layer glass panels are generally produced in combination with the interlayers. First, at least one multilayer interlayer is placed between two substrates and any excess interlayer is trimmed from the edges, creating an assembly. It is not uncommon for multiple interlayers to be placed within the two substrates creating a multiple layer glass panel with multiple interlayers. Then, air is removed from the assembly by an applicable process or method known to one of skill in the art; e.g., through nip rollers, vacuum bag, vacuum ring, or another de-airing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process known to one of ordinary skill in the art such as, but not limited to, autoclaving.

An emerging market in architectural laminated glass requires multilayer interlayers with structural properties. Such an interlayer is Eastman's Saflex DG which is made of plasticized polyvinyl butyral ("PVB"). A structural poly (vinyl acetal) interlayer, Saflex™ DG41 (a poly(vinyl butyral) polymer having an Mw of about 170,000, is commercially available for applications in the architectural space. Saflex™ DG interlayers are stiffer products than standard PVB interlayers and the higher stiffness allows laminates made with Saflex™ DG interlayer to sustain higher loads. Alternatively, Saflex™ DG interlayers can be used to allow a reduction in the glass thickness while achieving the same laminate loading.

Higher performance interlayers are desirable as more applications requiring such stiffer interlayers are growing (single side balcony laminates, canopies, staircases, support beams, etc). However, there are limitations to how far monolithic PVB interlayers can be developed both in terms of formulation and the ability to extrude such formulations at a reasonable cost. Further, the attraction of glass in many of these structural applications is the clarity of the glass panel. The glass panel having an increase in the stiffness for some applications should also have good optical clarity.

SUMMARY OF THE INVENTION

We have discovered a multilayer interlayer that has superior stiffness, and when laminated into a glass panel, the glass panel optionally exhibits good clarity where such applications are desired.

There is now provided a multilayer interlayer structure comprising:
 (A) a first polyvinyl acetal ("poly(vinyl acetal)") layer comprising poly(vinyl acetal) resin; and
 (B) one or more cellulose ester ("CE") layers comprising cellulose esters; and
 (C) a second poly(vinyl acetal) layer comprising poly(vinyl acetal) resin;
wherein at least one CE layer is disposed between the first and second poly(vinyl acetal) layers.

More than one CE layer may be provided between the at least two poly(vinyl acetal) layers. The CE layer provides structural strength to the multilayer interlayer by increasing the E' storage modulus of the multilayer interlayer. A glass panel made with the multilayer interlayer containing a CE interlayer has the capability of exhibiting good optical clarity where needed.

DETAILED DESCRIPTION OF THE INVENTION

The term "multilayer interlayer" is at least two layers, at least one of those layers is poly(vinyl acetal) resin and at least one of those layers is CE. The multiple layers may be separately extruded layers, co-extruded layers, or any combination of separately and co-extruded layers. Thus the multilayered interlayer could comprise, for example: two or more single-layer interlayers combined together ("plural-layer interlayer"); two or more layers co-extruded together ("co-extruded interlayer"); two or more co-extruded interlayers combined together; a combination of at least one single-layer interlayer and at least one co-extruded interlayer; and a combination of at least one plural-layer interlayer and at least one co-extruded interlayer.

Whenever a degree of substitution is referred to, whether for a total DS/AGU, an acetyl DS/AGU, a propionyl DS/AGU, or a butyryl DS/AGU, the degree of substitution is an average.

A multilayered interlayer comprises at least two polymer layers (e.g., a single layer or multiple layers co-extruded) disposed in direct or indirect contact with each other, desirably in direct contact with each other, wherein each layer comprises a polymer resin, as detailed more fully below. When 3 or more layers are employed, at least three of the layers can be referred to as skin layers and one or more one or more core layers. As used herein, "skin layer" generally refers to outer layers of the interlayer and "one or more core layers" generally refers to one or more of the inner layer(s) disposed between the skin layers. At least one side of a one or more core layers can be in direct contact with at least one side of a skin layers or may be indirect contact with a skin layers, such as through a polymer layer. Thus, one exemplary multilayer embodiment would be: poly(vinyl acetal)/CE/poly(vinyl acetal) (e.g. a skin layer/core layer/skin layer), or poly(vinyl acetal)/CE (e.g. skin/core), poly(vinyl acetal)/CE/poly(vinyl acetal)/polymer film (e.g. skin/core/skin/polymer), or poly(vinyl acetal)/CE/CE/poly(vinyl acetal) (e.g skin/core/core/skin), or poly(vinyl acetal)/CE/CE/poly(vinyl acetal)/polymer (e.g. skin/core/core/skin/polymer, or a poly(vinyl acetal)/CE/poly(vinyl acetal)/CE/poly(vinyl acetal). The multilayer interlayer can also have more than three layers (e.g., 4, 5, 6, or up to 10 or more individual layers, so long as at least one of the layers is a poly(vinyl acetal) layer and a CE layer). The multilayer interlayer can contain two, three, four, or more of the poly(vinyl acetal) layers, and two or more of them can be in direct contact with each other or with a CE layer or with other types of layers. The multilayer interlayer can contain two, three, four, or more CE layers, and two of more of them can be in direct contact with each other or with the poly(vinyl acetal) layer or with other types of layers. Desirably, in the multilayer interlayer structure having at least 3 layers, at least one of the CE layers is disposed between two poly(vinyl acetal) layers, or put another way, forms one or more core layers. By disposed is meant its location and the layer does not necessarily have to be in direct contact with the reference layers. Desirably, in a multilayer interlayer structure having at least 3 layers, the multilayer has at least 2 outer poly(vinyl acetal) layers, or put another way, forms one or more skin layers.

Poly(Vinyl Acetal) Layer

There is now provided a multilayer interlayer structure comprising:
  (A) a first polyvinyl acetal ("poly(vinyl acetal)") layer comprising poly(vinyl acetal) resin; and
  (B) one or more cellulose ester ("CE") layers comprising cellulose esters; and
  (C) a second poly(vinyl acetal) layer comprising poly(vinyl acetal) resin;
wherein at least one CE layer is disposed between the first and second poly(vinyl acetal) layers. The first and second poly(vinyl acetal) layers can contain the same or different types of poly(vinyl acetal) resin.

The following description of the poly(vinyl acetal) resins applies to the first, second, and any other additional poly(vinyl acetal) layers or resins used in the multilayer interlayer. The poly(vinyl acetal) in the poly(vinyl acetal) layer and the CE's in the CE layers are thermoplastic. Their method of manufacture is not limited. The poly(vinyl acetal) resin can be produced by known aqueous or solvent acetalization processes, such as by reacting PVOH with an aldehyde such as butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399 (2003), the entire disclosures of which are incorporated herein by reference.

Poly(vinyl acetal) resins typically have a residual hydroxyl content, an ester content, and an acetal content. As used herein, residual hydroxyl content (calculated as PVOH) refers to the weight percent of moieties having a hydroxyl group remaining on the polymer chains. For example, poly(vinyl acetal) can be manufactured by hydrolyzing poly(vinyl acetate) to PVOH, and then reacting the PVOH with an aldehyde, such as butyraldehyde, propionaldehyde, and the like, and desirably butyraldehyde, to make a polymer having repeating vinyl butyral units. In the process of hydrolyzing the poly(vinyl acetate), typically not all of the acetate side groups are converted to hydroxyl groups. Further, reaction with butyraldehyde typically will not result in the conversion of all hydroxyl groups on the PVOH to acetal groups. Consequently, in any finished poly(vinyl butyral), there typically will be residual ester groups such as acetate groups (as vinyl acetate groups) and residual hydroxyl groups (as vinyl hydroxyl groups) as side groups on the polymer chain and acetal (e.g. butyral) groups (as vinyl acetal groups). As used herein, residual hydroxyl content is measured on a weight percent basis per ASTM 1396.

An example of a polyvinyl butyral structure is used to further illustrate how the weight percentages are based from the moiety unit to which is bonded the relevant pendant group:

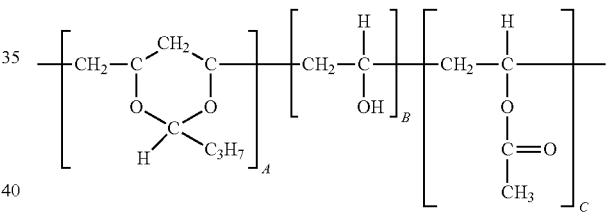

Taking the above structure of a polyvinyl butyral, the butyral or acetal content is based on the weight percentage of the unit A in the polymer, and OH content is based on the weight percentage of the unit B in the polymer (a polyvinyl OH moiety or PVOH), and the acetate or ester content is based on the weight percentage of unit C in the polymer.

Notably, for a given type of plasticizer, the compatibility of the plasticizer in the polymer is largely determined by the hydroxyl content of the polymer. Polymers with greater residual hydroxyl content are typically correlated with reduced plasticizer compatibility or capacity, typically due to the hydrophobicity of the plasticizer being more compatible with fewer hydrophilic groups present on the polymer chain. Conversely, polymers with a lower residual hydroxyl content typically will result in increased plasticizer compatibility or capacity. Generally, this correlation between the residual hydroxyl content of a polymer and plasticizer compatibility/capacity can be manipulated and exploited to allow for addition of the proper amount of plasticizer to the polymer resin and to stably maintain differences in plasticizer content between multiple interlayers.

The hydroxyl group content of the poly(vinyl acetal) resin is not particularly limited, but suitable amounts are from at least about 6, or at least about 8, or at least about 10, or at least about 11, or at least about 12, or at least about 13, or at least about 14, or at least about 15, or at least about 16, or at least about 17, and in each case up to about 35 wt. % PVOH. For example, suitable weight percent (wt. %) hydroxyl groups ranges calculated as PVOH include about 6 to 35, or 6 to 30, or 6 to 25, or 6 to 23, or 6 to 20, or 6 to 18, or 6 to 17, or 6 to 16, or 6 to 15, or 7 to 35, or 7 to 30, or 7 to 25, or 7 to 23, or 7 to 20, or 7 to 18, or 7 to 17, or 7 to 16, or 7 to 15, or 8 to 35, or 8 to 30, or 8 to 25, or 8 to 23, or 8 to 20, or 8 to 18, or 8 to 17, or 8 to 16, or 8 to 15, or 9 to 35, or 9 to 30, or 9 to 25, or 9 to 23, or 9 to 20, or 9 to 18, or 9 to 17, or 9 to 16, or 9 to 15, or 10 to 35, or 10 to 30, or 10 to 25, or 10 to 23, or 10 to 20, or 10 to 18, or 10 to 17, or 10 to 16, or 10 to 15, or 11 to 35, or 11 to 30, or 11 to 25, or 11 to 23, or 11 to 20, or 11 to 18, or 11 to 17, or 11 to 16, or 11 to 15, or 12 to 35, or 12 to 30, or 12 to 25, or 12 to 23, or 12 to 20, or 12 to 18, or 12 to 17, or 12 to 16, or 12 to 15, or 13 to 35, or 13 to 30, or 13 to 25, or 13 to 23, or 13 to 20, or 13 to 18, or 13 to 17, or 13 to 16, or 13 to 15, or 14 to 35, or 14 to 30, or 14 to 25, or 14 to 23, or 14 to 20, or 14 to 18, or 14 to 17, or 14 to 16, or 14 to 15, or 15 to 35, or 15 to 30, or 15 to 25, or 15 to 23, or 15 to 20, or 15 to 18, or 15 to 17, or 15 to 16, or 16 to 35, or 16 to 30, or 16 to 25, or 16 to 23, or 16 to 20, or 16 to 18, or 16 to 17, or 17 to 35, or 17 to 30, or 17 to 25, or 17 to 23, or 17 to 20, or 17 to 18. If desired, the hydroxyl wt. % as PVOH chosen can be on the lower end of the ranges. In general, a poly(vinyl acetal) polymer having a lower hydroxyl wt. % has the capability of absorbing more plasticizer and absorbing it more efficiently.

Where optical clarity is desired, however, the hydroxyl wt. % can have an influence on the refractive index of the poly(vinyl acetal) resin. Therefore, depending on the type of CE selected, the hydroxyl wt. % of the poly(vinyl acetal) can be adjusted along with the amount of plasticizer to achieve the desired refractive index where optical clarity is desirable. For example, suitable ranges of hydroxyl wt. % calculated as PVOH units, can range from 15 to 25, or 15 to 23, or 15 to 20, or 15 to 18, or 15 to 17, or 15 to 16, or 16 to 25, or 16 to 23, or 16 to 20, or 16 to 18, or 16 to 17, or 17 to 25, or 17 to 23, or 17 to 20, or 17 to 18, can be selected to enhance the optical clarity of the monolithic interlayer sheet laminated to glass.

The poly(vinyl acetal) resin used to make a layer can also comprise 20 wt. % or less, or 17 wt. % or less, or 15 wt. % or less of residual ester groups, including 13 wt. % or less, or 11 wt. % or less, or 9 wt. % or less, or 7 wt. % or less, or 5 wt. % or less, or 4 wt. % or less residual ester groups calculated as polyvinyl ester, e.g., acetate, with the balance being an acetal, preferably butyraldehyde acetal, but optionally including other acetal groups in a minor amount, for example, a 2-ethyl hexanal group (see, for example, U.S. Pat. No. 5,137,954, the entire disclosure of which is incorporated herein by reference). Suitable ranges of residual ester groups by wt. % include 0 to 20, or 0 to 17, or 0 to 15, or 0 to 13, or 0 to 11, or 0 to 9, or 0 to 7, or 0 to 5, or 0 to 4 1 to 20, or 1 to 17, or 1 to 15, or 1 to 13, or 1 to 11, or 1 to 9, or 1 to 7, or 1 to 5, or 1 to 4, or 1 to 20, or 1 to 17, or 1 to 15, or 1 to 13, or 1 to 11, or 1 to 9, or 1 to 7, or 1 to 5, or 1 to 4, or 2 to 20, or 2 to 17, or 2 to 15, or 2 to 13, or 2 to 11, or 2 to 9, or 2 to 7, or 2 to 5, or 2 to 4, or 3 to 20, or 3 to 17, or 3 to 15, or 3 to 13, or 3 to 11, or 3 to 9, or 3 to 7, or 3 to 5, or 3 to 4, or 3 to 20, or 3 to 17, or 3 to 15, or 3 to 13, or 3 to 11, or 3 to 9, or 3 to 7, or 3 to 5, or 3 to 4, or 4 to 20, or 4 to 17, or 4 to 15, or 4 to 13, or 4 to 11, or 4 to 9, or 4 to 7, or 4 to 5, or 6 to 20, or 6 to 17, or 6 to 15, or 6 to 13, or 6 to 11, or 6 to 9. As with the residual hydroxyl group measurement, the weight percent of residual ester groups (e.g. acetate) is based on the moiety in the polymer backbone onto which is linked the acetate group, including the pendant acetate group.

The poly(vinyl acetal) resin used in the invention can also have an acetal content of at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %. Additionally or in the alternative, the acetal content can be up to 94 wt. %, or up to 93 wt. %, or up to 92, wt. %, or up to 91.%, or up to 90 wt. %, or up to 89 wt. %, or up to 88 wt. %, or up to 86 wt. %, or up to 85 wt. %, or up to 84 wt. %, or up to 83 wt. %, or up to 82 wt. %, or up to 80 wt. %, or up to 78 wt. %, or up to 77 wt. %, or up to 75 wt. %, or up to 70 wt. %, or up to 65 wt. %. Suitable ranges of acetal content in the poly(vinyl acetal) resin used in the invention include 50 to 94, or 50 to 93, or 50 to 92, or 50 to 91, or 50 to 90, or 50 to 89, or 50 to 88, or 50 to 86, or 50 to 85, or 50 to 84, or 50 to 84, or 50 to 83, or 50 to 82, or 50 to 80, or 50 to 78, or 50 to 77, or 50 to 75, or 50 to 70, or 50 to 65, or 55 to 94, or 55 to 93, or 55 to 92, or 55 to 91, or 55 to 90, or 55 to 89, or 55 to 88, or 55 to 86, or 55 to 85, or 55 to 84, or 55 to 84, or 55 to 83, or 55 to 82, or 55 to 80, or 55 to 78, or 55 to 77, or 55 to 75, or 55 to 70, or 55 to 65, or 60 to 94, or 60 to 93, or 60 to 92, or 60 to 91, or 60 to 90, or 60 to 89, or 60 to 88, or 60 to 86, or 60 to 85, or 60 to 84, or 60 to 84, or 60 to 83, or 60 to 82, or 60 to 80, or 60 to 78, or 60 to 77, or 60 to 75, or 60 to 70, or 60 to 65, or 65 to 94, or 65 to 93, or 65 to 92, or 65 to 91, or 65 to 90, or 65 to 89, or 65 to 88, or 65 to 86, or 65 to 85, or 65 to 84, or 65 to 84, or 65 to 83, or 65 to 82, or 65 to 80, or 65 to 78, or 65 to 77, or 65 to 75, or 65 to 70, or 70 to 94, or 70 to 93, or 70 to 92, or 70 to 91, or 70 to 90, or 70 to 89, or 70 to 88, or 70 to 86, or 70 to 85, or 70 to 84, or 70 to 84, or 70 to 83, or 70 to 82, or 70 to 80, or 70 to 78, or 70 to 77, or 70 to 75, or 75 to 94, or 75 to 93, or 75 to 92, or 75 to 91, or 75 to 90, or 75 to 89, or 75 to 88, or 75 to 86, or 75 to 85, or 75 to 84, or 75 to 84, or 75 to 83, or 75 to 82, or 75 to 80, or 75 to 78, or 75 to 77, 80 to 94, or 80 to 93, or 80 to 92, or 80 to 91, or 80 to 90, or 89 to 89, or 80 to 88, or 80 to 86, or 80 to 85, or 80 to 84, or 80 to 83, or 80 to 82, 85 to 94, or 85 to 93, or 85 to 92, or 85 to 91, or 85 to 90, or 85 to 89, or 85 to 88, or 85 to 86, or 90 to 94, or 90 to 93, or 90 to 92.

In each case, the acetal content is desirably a butyral content.

Some of the range combinations can be those corresponding to the checked boxes in Table 1 below.

TABLE 1

| OH wt. % | Ester wt % | | | | | | | | | | | | | | |
|---|---|---|---|---|---|---|---|---|---|---|---|---|---|---|---|
| | 0-20 | 1-20 | 2-17 | 2-15 | 2-13 | 2-8 | 2-6 | 3-20 | 3-15 | 0-13 | 3-11 | 3-9 | 4-20 | 4-17 | 4-15 |
| 6-25 | X | X | | X | X | X | X | X | X | | X | X | X | X | X |
| 7-25 | X | X | | X | | X | X | | | | | | X | X | X | X |
| 8-25 | X | X | | X | | | | | | | | | X | | X | X |

TABLE 1-continued

| OH wt. % | Ester wt % | | | | | | | | | | | | | |
|---|---|---|---|---|---|---|---|---|---|---|---|---|---|---|
| | 0-20 | 1-20 | 2-17 | 2-15 | 2-13 | 2-8 | 2-6 | 3-20 | 3-15 | 0-13 | 3-11 | 3-9 | 4-20 | 4-17 | 4-15 |
| 9-25 | X | X | | X | | | | | | | | | | | |
| 10-25 | X | X | | X | | | | | | | | | | | |
| 6-23 | | X | X | X | X | X | X | X | X | | X | X | X | X | X |
| 8-23 | | X | | X | | | | | | | | x | | X | X |
| 9-23 | | X | | X | | | | | | | | | | | |
| 6-20 | | X | X | X | X | X | X | X | X | | X | X | X | X | X |
| 8-20 | | X | | X | | | | | | | | x | | X | X |
| 9-20 | | X | | X | | | | | | | | | | | |
| 10-20 | | X | | X | | | | | | | | | | | |
| 6-18 | | X | X | X | X | X | X | X | X | | X | X | X | X | X |
| 15-23 | | | | | | | | | | X | | | | | |
| 15-20 | | | | | | | | | | X | | | | | |
| 17-23 | | | | | | | | | | X | | | | | |
| 17-20 | | | | | | | | | | X | | | | | |
| 9-18 | | X | | X | | | | | | | | | | | |
| 10-18 | | X | | X | | | | | | | | | | | |
| 6-15 | | X | X | X | X | X | X | X | X | | X | X | X | X | X |
| 8-15 | | X | | X | | | | | | | | X | | X | X |
| 10-15 | | X | | X | | | | | | | | | | | |
| Acetal Wt. % | 50-94 | 65-89 | 70-92 | 70-88 | 90-92 | 70-91 | 75-91 | 65-91 | 70-91 | 70-84 | 75-91 | 65-89 | 75-89 | 70-88 | 75-88 |

The acetal groups are not limited, and can be vinyl propynal groups, vinyl butyral groups, and the like, and are desirably vinyl butyral groups.

The weight average molecular weight of the poly(vinyl acetal) layer, or at least one of the skin layers, is not particularly limited. The poly(vinyl acetal) resin can have a weight average molecular weight ($M_w$) of at least 20,000, or at least 30,000, or at least 40,000, or at least 50,000, or at least 60,000, or at least 70,000, with no particular upper limit, although practically up to 300,000 Daltons is suitable, and in each case as measured by size exclusion chromatography using the low angle laser light scattering (SEC/LALLS) method of Cotts and Ouano in tetra-hydrofuran. The term "molecular weight" means the weight average molecular weight ($M_w$). The method for determining the molecular weight as set forth in this description includes using hexafluorisopropanol as the mobile phase (0.8 mL/minute). Each sample is prepared by weighing approximately 20 milligrams of resin into a 25 mL flask and adding 10 mL of the mobile phase. The flask is then placed in an automated shaking device until the polymer is fully dissolved. The analysis is performed using a three-detector system that includes a Viscotek GPCmax (with an autosampler, pump, and degasser), a Viscotek triple detector TDA302 (RALL/LALLS, Viscometer, and DRI combination) with a column oven (commercially available from Malvern Instruments, Malvern, UK). The separation is performed by three Viscotek mixed bed columns, including a type I-MB (one low and two high range molecular weight) maintained at 45° C. The complete detector set up is calibrated using a narrow poly(methyl methacrylate) standard (commercially available from Viscotek) with a reported molecular weight of 93.458, an intrinsic viscosity of 0.615, and a differential index of refraction (dn/dc) value of 0.1875. The refractive index of the mobile phase is 1.2649 and a do/dc value of 0.189 is used for PVB. Viscotek Omnisec 4.7.0 software (commercially available from Malvern Instruments) is used for data calculations.

Examples of suitable Mw ranges for the poly(vinyl acetal) layers include 20,000 to 300,000, or 20,000 to 250,000, or 20,000 to 220,000, or 20,000 to 200,000, or 20,000 to 190,000, or 20,000 to 170,000, or 20,000 to 160,000, or 20,000 to 140,000, or 20,000 to 120,000, or 20,000 to 100,000, or 20,000 to 90,000, or 20,000 to 70,000, or 30,000 to 300,000, or 30,000 to 250,000, or 30,000 to 220,000, or 30,000 to 200,000, or 30,000 to 190,000, or 30,000 to 170,000, or 30,000 to 160,000, or 30,000 to 140,000, or 30,000 to 120,000, or 30,000 to 100,000, or 30,000 to 90,000, or 30,000 to 70,000, or 40,000 to 300,000, or 40,000 to 250,000, or 40,000 to 220,000, or 40,000 to 200,000, or 40,000 to 190,000, or 40,000 to 170,000, or 40,000 to 160,000, or 40,000 to 140,000, or 40,000 to 120,000, or 40,000 to 100,000, or 40,000 to 90,000, or 40,000 to 70,000, or 70,000 to 300,000, or 70,000 to 250,000, or 70,000 to 220,000, or 70,000 to 200,000, or 70,000 to 190,000, or 70,000 to 170,000, or 70,000 to 160,000, or 70,000 to 140,000, or 70,000 to 120,000, or 70,000 to 100,000, or 70,000 to 90,000, or 90,000 to 300,000, or 90,000 to 250,000, or 90,000 to 220,000, or 90,000 to 200,000, or 90,000 to 190,000, or 90,000 to 170,000, or 90,000 to 160,000, or 90,000 to 140,000, or 90,000 to 120,000, or 90,000 to 100,000, or 120,000 to 300,000, or 120,000 to 250,000, or 120,000 to 220,000, or 120,000 to 200,000, or 120,000 to 190,000, or 120,000 to 170,000, or 120,000 to 160,000, or 120,000 to 140,000, or 160,000 to 300,000, or 160,000 to 250,000, or 160,000 to 220,000, or 160,000 to 200,000, or 160,000 to 190,000.

The amount of poly(vinyl acetal) in the poly(vinyl acetal) interlayer can be at least 60 wt. %, or at least 65 wt. %, or at least 70 wt. %, or at least 75 wt. %, or at least 80 wt. %, or at least 85 wt. %, or at least 90 wt. % or at least 95 wt. %. Additionally or in the alternative, the amount of poly(vinyl acetal) present in a poly(vinyl acetal) interlayer can be up to 98 wt. %, or up to 95 wt. %, or up to 90 wt. %, or up to 85 wt. %, or up to 83 wt. %, or up to 81 wt. %, or up to 80 wt. %, or up to 75 wt. %, or up to 70 wt. %, based on the weight of all ingredients in the poly(vinyl acetal) layer. In each case, the poly(vinyl acetal) resin is desirably a polyvinyl butyral resin.

The Tg of the poly(vinyl acetal) layers can be less than 50° C. A low Tg value in a poly(vinyl acetal) layer can contribute to a higher glass/interlayer adhesion and/or a better ability to absorb impact energy. Desirably the Tg of at least one of the poly(vinyl acetal) layers is 50° C. or less, or not greater than 49° C., or not greater than 48° C., or not greater than 47° C., or not greater than 46° C., or not greater than 45° C., or not greater than 44° C., or not greater than 43° C., or not greater than 42° C., or not greater than 41 ° C., or not greater than 40° C., or not greater than 39° C., or not greater than 38° C., or not greater than 37° C., or not greater than 36° C., or not greater than 37° C., or not greater than 36° C., or not greater than 35° C., or not greater than 34° C., or not greater than 33° C., or not greater than 32° C., or not greater than 31 ° C., or not greater than 30° C., and in each case at least −20° C., or at least 0° C., or at least 25° C.

The Tg of a poly(vinyl acetal) layer can, if desired, be at least 10° C., or at least 20° C., or at least 30° C., or at least 40° C., or at least 45° C., or at least 50° C., or at least 60° C., or at least 65° C., or at least 70° C., or at least 75° C., or at least 80° C., or at least 85° C., or at least 90° C., or at least 95° C., or at least 100° C., or at least 110° C., or at least 120° C., or at least 130° C. less than the Tg of at least one of the CE layers.

The glass transition temperature (Tg) of the poly(vinyl acetal) layer is determined by rheometric dynamic analysis using the following procedure. The poly(vinyl acetal) sheet is molded into a sample disc of 25 millimeters (mm) in diameter. The poly(vinyl acetal) sample disc is placed between two 25 mm diameter parallel plate test fixtures of a Rheometrics Dynamic Spectrometer II. The poly(vinyl acetal) sample disc is tested in shear mode at an oscillation frequency of 1 Hertz as the temperature of the poly(vinyl acetal) sample is increased from −20 to 70° C. at a rate of 2° C./minute. The position of the maximum value of tan delta (damping) plotted as dependent on temperature is used to determine Tg. Experience indicates that the method is reproducible to within +/−1° C.

Each of the poly(vinyl acetal) layers (or skin layers) of the multilayer interlayer may have a thickness of at least about 1 mil, or at least 5 mils, or at least 10 mils, or at least 15 mils, or at least 30 mils. There is no particular limit on how thick the poly(vinyl acetal) layer can be, but generally each layer can be up to 120 mils, or up to 95 mils, or up to 90 mils, or up to 80 mils, or up to 65 mils.

Anti-blocking agents may also be added to the composition of the present invention to reduce the level of blocking of the interlayer. Desirably, they are added to the skin layer, or a poly(vinyl acetal) layer. Anti-blocking agents are known in the art, and any anti-blocking agent that does not adversely affect the properties of the interlayer may be used. A particularly preferred anti-blocking agent that can be successfully used as in the multilayer interlayer while not affecting optical properties of the interlayer or the adhesive properties of the interlayer to glass is a fatty add amide (see, for example, U.S. Pat. No. 6,825,255, the entire disclosure of which is incorporated herein).

Other additives may be incorporated into the poly(vinyl acetal) layer to enhance its performance in a final product and impart certain additional properties to the interlayer. Such additives include, but are not limited to, dyes, pigments, stabilizers (e.g., ultraviolet stabilizers), antioxidants, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of ordinary skill in the art.

The additives, in liquid, powder, or pellet form, are often used and can be mixed into the thermoplastic resin or plasticizer prior to arriving in the extruder device or combined with the thermoplastic resin inside the extruder device. These additives are incorporated into the thermoplastic composition, and by extension the resultant multilayer interlayer, to enhance certain properties of the interlayer and its performance in a multiple layer glass panel product.

Cellulose Ester Layer

The following description of CE's applies to all CE layers and CE's used in the multilayer interlayer. As mentioned above, the multilayer interlayer of the invention has the following structure:
(A) a first polyvinyl acetal ("poly(vinyl acetal)") layer comprising poly(vinyl acetal) resin; and
(B) one or more cellulose ester ("CE") layers comprising cellulose esters; and
(C) a second poly(vinyl acetal) layer comprising poly (vinyl acetal) resin;
wherein at least one CE layer is disposed between the first and second poly(vinyl acetal) layers.

The cellulose esters useful in the present invention can be prepared using techniques known in the art or can be commercially obtained, e.g., from Eastman Chemical Company, Kingsport, Tenn., U.S.A.

The cellulose ester used in the present invention generally comprise repeating units of the structure:

Formula 1

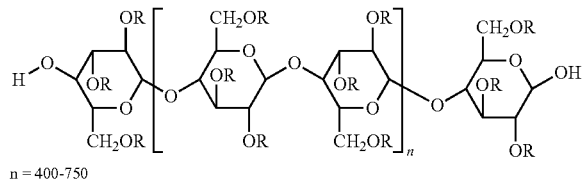

n = 400-750 wherein R may be selected independently from the group consisting of hydrogen or a straight chain alkanoyl (also referred to as acyl) (which forms an ester group when bonded to O) having from 2 to 10 carbon atoms. For cellulose esters, the substitution level is usually expressed in terms of degree of substitution ("DS"), which is the average number of substituents per anhydroglucose unit ("AGU"). The above formula between brackets shows 2 AGUs. Generally, conventional cellulose contains three hydroxyl groups per AGU that can be substituted; therefore, the DS can have a value between zero and three. Generally, cellulose is a large polysaccharide with a degree of polymerization from 110 to 375 and a maximum DS of 3.0.

Because DS is a statistical mean value, a value of 1 does not assure that every AGU has a single substituent. In some cases, there can be unsubstituted AGUs, some with two substituents, and some with three substituents. The cellulose esters can have an total acyl group content ("TAG"), which is the combination of all R acyl groups including the acetyl, propionyl, butyryl, etc., on a weight % basis (total weight of acyl groups divided by total weight of the cellulose ester) of at least about 15, or at least 20, or at least 25, or at least 30, or at least 35, or at least 37, or at least 40, or at least 45 wt. %. The upper amount is not particularly limited, and can be as high as complete substitution of all hydroxyl groups, or up to 60 wt. %, or up to 55 wt. %. The particular total acyl group content by wt. % selected will depend on the type of acyl group substituents bonded to the cellulose ester backbone, as well as the properties desired. An increase in the TAG content generally renders the cellulose ester polymer more hydrophobic, increases it Tg, and improves its flexibility. Suitable ranges of TAG content on a weight % basis range from 15 to 60, or 15 to 55, or 20 to 60, or 20 to 55, or 25 to 60, or 25 to 55, or 30 to 60, or 30 to 55, or 35 to 60, or 35 to 55, 37 to 60, or 37 to 55, or 40 to 60, or 40 to 55, or 45 to 60, or 45 to 55. To improve interfacial compatibility with a PVB film and/or enhance the Tg of the CE layer, the TAG content on a weight basis is generally in a range from 30-60, or 35 to 55, or 40-60, or 45-55.

The "total DS" is defined as the average number of acyl substituents per AGU, the substituents being any one or more R groups having C1-10 carbons, desirably 2-4 carbons. In one embodiment of the invention, the CEs can have a total DS per AGU (total DS/AGU) of at least 1, or at least 1.2, or at least 1.5, or at least 1.7, or at least 1.9, or at least 2, or at least 2.2, or at least 2.3, or at least 2.4, or at least 2.5, or at least 2.6, and can be up to 6, or up to 5, or up to 4, or up to 3.5, or up to 3.3, or up to 3, or up to 2.95, or up to 2.90, or up to 2.85, or up to 2.8, or up to 2.75, or up to 2.7, or up to 2.6, or up to 2.5, or up to 2.45, or up to 2.4, or up to 2.35, or up to 2.3, or up to 2.25, or up to 2.2, or up to 2.15, or up to 2.1. Suitable ranges are 1-6, or 1-5, or 1-4, or 1-3.5, or 1-3, or 1-2.95, or 1-2.90, or 1-2.85, or 1-2.80, or 1-2.75, or 1-2.7, or 1-2.6, or 1-2.5, or 1-2.45, or 1-2.4, or 1-2.35, or 1-2.3, or 1-2.25, or 1-2.2, or 1-2.15, or 1-2.1, or 1.2-6, or 1.2-5, or 1.2-4, or 1.2-3.5, or 1.2-3, or 1.2-2.95, or 1.2-2.90, or 1.2-2.85, or 1.2-2.80, or 1.2-2.75, or 1.2-2.7, or 1.2-2.6, or 1.2-2.5, or 1.2-2.45, or 1.2-2.4, or 1.2-2.35, or 1.2-2.3, or 1.2-2.25, or 1.2-2.2, or 1.2-2.15, or 1.2-2.1, or 1.5-6, or 1.5-5, or 1.5-4, or 1.5-3.5, or 1.5-3, or 1.5-2.95, or 1.5-2.90, or 1.5-2.85, or 1.5-2.80, or 1.5-2.75, or 1.5-2.7, or 1.5-2.6, or 1.5-2.5, or 1.5-2.45, or 1.5-2.4, or 1.5-2.35, or 1.5-2.3, or 1.5-2.25, or 1.5-2.2, or 1.5-2.15, or 1.5-2.1, or 1.7-6, or 1.7-5, or 1.7-4, or 1.7-3.5, or 1.7-3, or 1.7-2.95, or 1.7-2.90, or 1.7-2.85, or 1.7-2.80, or 1.7-2.75, or 1.7-2.7, or 1.7-2.6, or 1.7-2.5, or 1.7-2.45, or 1.7-2.4, or 1.7-2.35, or 1.7-2.3, or 1.7-2.25, or 1.7-2.2, or 1.7-2.15, or 1.7-2.1, or 2-6, or 2-5, or 2-4, or 2-3.5, or 2-3, or 2-2.95, or 2-2.90, or 2-2.85, or 2-2.80, or 2-2.75, or 2-2.7, or 2-2.6, or 2-2.5, or 2-2.45, or 2-2.4, or 2-2.35, or 2-2.3, or 2-2.25, or 2-2.2, or 2-2.15, or 2-2.1, or 2.2-6, or 2.2-5, or 2.2-4, or 2.2-3.5, or 2.2-3, or 2.2-2.95, or 2.2-2.90, or 2.2-2.85, or 2.2-2.80, or 2.2-2.75, or 2.2-2.7, or 2.2-2.6, or 2.2-2.5, or 2.2-2.45, or 2.2-2.4, or 2.2-2.35, or 2.2-2.3, or 2.2-2.25, or 2.2-2.2, or 2.2-2.15, or 2.2-2.1, or 2.3-6, or 2.3-5, or 2.3-4, or 2.3-3.5, or 2.3-3, or 2.3-2.95, or 2.3-2.90, or 2.3-2.85, or 2.3-2.80, or 2.3-2.75, or 2.3-2.7, or 2.3-2.6, or 2.3-2.5, or 2.3-2.45, or 2.3-2.4, or 2.3-2.35, or 2.4-6, or 2.4-5, or 2.4-4, or 2.4-3.5, or 2.4-3, or 2.4-2.95, or 2.4-2.90, or 2.4-2.85, or 2.4-2.80, or 2.4-2.75, or 2.4-2.7, or 2.4-2.6, or 2.4-2.5, or 2.4-2.45, or 2.5-6, or 2.5-5, or 2.5-4, or 2.5-3.5, or 2.5-3, or 2.5-2.95, or 2.5-2.90, or 2.5-2.85, or 2.5-2.80, or 2.5-2.75, or 2.5-2.7, or 2.5-2.6, or 2.6-6, or 2.6-5, or 2.6-4, or 2.6-3.5, or 2.6-3, or 2.6-2.95, or 2.6-2.90, or 2.6-2.85, or 2.6-2.80, or 2.6-2.75, or 2.6-2.7, or 2.7-6, or 2.7-5, or 2.7-4, or 2.7-3.5, or 2.7-3, or 2.7-2.95, or 2.7-2.90, or 2.7-2.85, or 2.7-2.80. Desirably, the AG DS/AGU will be in a range of 2-3.5, or 2-3, or 2-2.95, or 2-2.90, or 2-2.85, or 2-2.80, or 2.2-3.5, or 2.2-3, or 2.2-2.95, or 2.2-2.90, or 2.2-2.85, or 2.2-2.80, or 2.3-3.5, or 2.3-3, or 2.3-2.95, or 2.3-2.90, or 2.3-2.85, or 2.3-2.80, or 2.4-3.5, or 2.4-3, or 2.4-2.95, or 2.4-2.90, or 2.4-2.85, or 2.4-2.80, or 2.5-3.5, or 2.5-3, or 2.5-2.95, or 2.5-2.90, or 2.5-2.85, or 2.5-2.80, 2.6-3.5, or 2.6-3, or 2.6-2.95, or 2.6-2.90, or 2.6-2.85, or 2.6-2.80, or 2.7-3.5, or 2.7-3, or 2.7-2.95, or 2.7-2.90, or 2.7-2.85, or 2.7-2.80. Generally, the DS/AGU for the AG's will be in the range of 2.3-3, or 2.3-2.95, or 2.3-2.90, or 2.3-2.85, or 2.3-2.80, or 2.4-3, or 2.4-2.95, or 2.4-2.90, or 2.4-2.85, or 2.4-2.80, or 2.5-3, or 2.5-2.95, or 2.5-2.90, or 2.5-2.85, or 2.5-2.80, 2.6-3, or 2.6-2.95, or 2.6-2.90, or 2.6-2.85, or 2.6-2.80, or 2.7-3, or 2.7-2.95, or 2.7-2.90, or 2.7-2.85, or 2.7-2.80.

The CEs can have a hydroxyl content of at least about 0.5, or at least 0.6, or at least 0.7, or at least 0.8, or at least 0.9, or at least 1.0, or at least 1.1, or at least 1.2, or at least 1.4, or at least 1.6, or at least 1.8, or at least 2.0, or at least 2.5, or at least 3, or at least 3.5, or at least 4, in each case as wt. %. Additionally or in the alternative, the CE can have a hydroxyl content of up to about 10, or up to about 9 or up to about 8, or up to about 7 or up to 6, or up to 5.5, or up to 5, or up to 4.5, or up to 3, or up to 2.3, or up to 2. The weight percent of hydroxyl content is based dividing the combined weight of all hydroxyl groups by the weight of the entire CE polymer. Suitable ranges of hydroxyl content are 0.5 to 10, or 0.5 to 9, or 0.5 to 8, or 0.5 to 7, or 0.5 to 6, or 0.5 to 5.5, or 0.5 to 5, or 0.5 to 4.5, or 0.5 to 3, or 0.5 to 2.3, or 0.5 to 2, or 0.6 to 8, or 0.6 to 7, or 0.6 to 6, or 0.6 to 5.5, or 0.6 to 5, or 0.6 to 4.5, or 0.6 to 3, or 0.6 to 2.3, or 0.6 to 2, or 0.7 to 8, or 0.7 to 7, or 0.7 to 6, or 0.7 to 5.5, or 0.7 to 5, or 0.7 to 4.5, or 0.7 to 3, or 0.7 to 2.3, or 0.7 to 2, or 0.8 to 8, or 0.8 to 7, or 0.8 to 6, or 0.8 to 5.5, or 0.8 to 5, or 0.8 to 4.5, or 0.8 to 3, or 0.8 to 2.3, or 0.8 to 2, or 0.9 to 8, or 0.9 to 7, or 0.9 to 6, or 0.9 to 5.5, or 0.9 to 5, or 0.9 to 4.5, or 0.9 to 3, or 0.9 to 2.3, or 0.9 to 2, or 1 to 8, or 1 to 7, or 1 to 6, or 1 to 5.5, or 1 to 5, or 1 to 4.5, or 1 to 3, or 1 to 2.3, or 1 to 2, or 1.1 to 8, or 1.1 to 7, or 1.1 to 6, or 1.1 to 5.5, or 1.1 to 5, or 1.1 to 4.5, or 1.1 to 3, or 1.1 to 2.3, or 1.1 to 2, or 1.2 to 8, or 1.2 to 7, or 1.2 to 6, or 1.2 to 5.5, or 1.2 to 5, or 1.2 to 4.5, or 1.2 to 3, or 1.2 to 2.3, or 1.2 to 2, or 1.3 to 8, or 1.3 to 7, or 1.3 to 6, or 1.3 to 5.5, or 1.3 to 5, or 1.3 to 4.5, or 1.3 to 3, or 1.3 to 2.3, or 1.3 to 2, or 1.4 to 8, or 1.4 to 7, or 1.4 to 6, or 1.4 to 5.5, or 1.4 to 5, or 1.4 to 4.5, or 1.4 to 3, or 1.4 to 2.3, or 1.4 to 2, or 1.5 to 8, or 1.5 to 7, or 1.5 to 6, or 1.5 to 5.5, or 1.5 to 5, or 1.5 to 4.5, or 1.5 to 3, or 1.5 to 2.3, or 1.5 to 2, or 1.6 to 8, or 1.6 to 7, or 1.6 to 6, or 1.6 to 5.5, or 1.6 to 5, or 1.6 to 4.5, or 1.6 to 3, or 1.6 to 2.3, or 1.6 to 2, or 1.7 to 8, or 1.7 to 7, or 1.7 to 6, or 1.7 to 5.5, or 1.7 to 5, or 1.7 to 4.5, or 1.7 to 3, or 1.7 to 2.3, or 1.7 to 2, or 1.8 to 8, or 1.8 to 7, or 1.8 to 6, or 1.8 to 5.5, or 1.8 to 5, or 1.8 to 4.5, or 1.8 to 3, or 1.8 to 2.3, or 1.8 to 2, or 1.9 to 8, or 1.9 to 7, or 1.9 to 6, or 1.9 to 5.5, or 1.9 to 5, or 1.9 to 4.5, or 1.9 to 3, or 1.9 to 2.3, or 1.9 to 2, or 2 to 8, or 2 to 7, or 2 to 6, or 2 to 5.5, or 2 to 5, or 2 to 4.5, or 2 to 3, or 2 to 2.3, or 2.1 to 8, or 2.1 to 7, or 2.1 to 6, or 2.1 to 5.5, or 2.1 to 5, or 2.1 to 4.5, or 2.2 to 8, or 2.2 to 7, or 2.2 to 6, or 2.2 to 5.5, or 2.2 to 5, or 2.2 to 4.5, or 2.3 to 8, or 2.3 to 7, or 2.3 to 6, or 2.3 to 5.5, or 2.3 to 5, or 2.3 to 4.5, or 2.5 to 8, or 2.5 to 7, or 2.5 to 6, or 2.5 to 5.5, or 2.5 to 5, or 2.5 to 4.5, or 2.5 to 3, or 3 to 8, or 3 to 7, or 3 to 6, or 3 to 5.5, or 3 to 5, or 3 to 4.5, or 3.5 to 8, or 3.5 to 7, or 3.5 to 6, or 3.5 to 5.5, or 3.5 to 5, or 3.5 to 4.5, or 4 to 8, or 4 to 7, or 4 to 6, or 4 to 5.5, or 4 to 5, in each case as a wt %.

An alternative measure of the hydroxyl content is on the basis of the 3-total acyl DS/AGU, the remainder being the average number of hydroxyl sites per AGU (OH#/AGU). For example, of the total acyl DS/AGU is 2.6, the average OH#/AGU is 0.4. The OH#/AGU is not a measure of substitution per AGU, but rather an average number of OH sites that are not substituted. The average OH#/AGU of hydroxyl groups can be from at least 0, or at least 0.005, or at least 0.05, or at least 0.1, or at least 0.15, or at least 0.2, or at least 0.25 or at least 0.3, or at least 0.35, or at least 0.4 DS. In each case, the average OH#/AGU can be up to up to 1.3, or up to 1.2, or up to 1, or up to 0.9, or up to 0.8, or 0.7, or up to 0.65, or up to 0.6, or up to 0.55, or up to 0.5, or up to 0.45, or up to 0.4, or up to 0.35, or up to 0.3. Suitable ranges of average OH#/AGU include 0.005 to 0.7, or 0.005 to 0.65, or 0.005 to 0.60, or 0.005 to 0.55, or 0.005 to 0.50, or 0.005 to 0.45, or 0.005 to 0.40, or 0.005 to 0.35, or 0.005 to 0.30, or 0.05 to 0.7, or 0.05 to 0.65, or 0.05 to 0.60, or 0.05 to 0.55, or 0.05 to 0.50, or 0.05 to 0.45, or 0.05 to 0.40, or 0.05 to 0.35, or 0.05 to 0.30, or 0.1 to 0.7, or 0.1 to 0.65, or 0.1 to 0.60, or 0.1 to 0.55, or 0.1 to 0.50, or 0.1 to 0.45, or 0.1 to 0.40, or 0.1 to 0.35, or 0.1 to 0.30, or 0.15 to 0.7, or 0.15 to 0.65, or 0.15 to 0.60, or 0.15 to 0.55, or 0.15 to 0.50, or 0.15 to 0.45, or 0.15 to 0.40, or 0.15 to 0.35, or 0.15 to 0.30, or 0.2 to 0.7, or 0.2 to 0.65, or 0.2 to 0.60, or 0.2 to 0.55, or 0.2 to 0.50, or 0.2 to 0.45, or 0.2 to 0.40, or 0.2 to 0.35, or 0.2 to 0.30, or 0.25 to 0.7, or 0.25 to 0.65, or 0.25 to 0.60, or 0.25 to 0.55, or 0.25 to 0.50, or 0.25 to 0.45, or 0.25 to 0.40, or 0.25 to 0.35, or 0.25 to 0.30, or 0.3 to 0.7, or 0.3 to 0.65, or 0.3 to 0.60, or 0.3 to 0.55, or 0.3 to 0.50, or 0.3 to 0.45, or 0.3 to 0.40, or 0.3 to 0.35, or 0.3 to 0.30. The hydroxyl number can be adjusted to increase its wettability and solubility in alcohols by increasing the hydroxyl number. The hydroxyl number can be adjusted to enhance compatibility of the CE film to the PVB film, which also contains a hydroxyl content. Generally, the average OH#/AGU is in the range of 0.005 to 0.5, or 0.005 to 0.45, or 0.005 to 0.40, or 0.005 to 0.35, or 0.1 to 0.4, or 0.1 to 0.35.

The DS/AGU can also refer to a particular substituent, such as, for example, hydroxyl, acetyl, butyryl, or propionyl. For instance, a cellulose acetate can have an acetyl DS/AGU of about 2.0 to about 2.5, with the remainder being hydroxyl groups, while a cellulose acetate propionate ("CAP") and cellulose acetate butyrate ("CAB") can have a total DS/AGU of about 1.7 to about 2.8, with the remainder being hydroxyl groups.

The cellulose ester can be a cellulose triester or a secondary cellulose ester. Examples of cellulose triesters include, but are not limited to, cellulose triacetate, cellulose tripropionate, or cellulose tributyrate. Examples of secondary cellulose esters include cellulose acetate, cellulose acetate propionate, and cellulose acetate butyrate. These cellulose esters are described in U.S. Pat. Nos. 1,698,049; 1,683,347; 1,880,808; 1,880,560; 1,984,147, 2,129,052; and 3,617,201, which are incorporated herein by reference in their entirety to the extent they do not contradict the statements herein.

The cellulose ester can be a cellulose acetate, cellulose acetate propionate, cellulose acetate butyrate, cellulose triacetate, cellulose diacetate, cellulose tripropionate, cellulose tributyrate, and mixtures thereof. Desirably, the CE is a cellulose acetate, cellulose acetate propionate, cellulose acetate butyrate, or mixtures thereof. The cellulose ester can be substituted with acetyl, propionyl, butyryl, or any aliphatic alkanoyl groups having 1 or more carbons up to 10. Desirably, the cellulose ester is substituted with C2-C4 alkanoyl groups. For example, the cellulose ester can be substituted with acetyl, propionate, or butyryl groups, either alone or in combination such as acetyl propionyl or acetyl butyryl. The cellulose ester made with these substituents will have an acetyl group content, a propionyl group content, and/or a butyryl group content.

The cellulose ester can have an acetyl group content that varies widely depending on whether the CE is a cellulose acetate polymer or a mixed CE. A mixed CE is a CE that has a mixture of 2 or more different R groups on the cellulose ester polymer backbone that are present by virtue of adding the corresponding reactants into a reaction mixture. Generally, a mixed CE will have a mixture of R=2 (acetyl) with other R groups, typically R=3 or 4.

In general, the acetyl group content of the CE, on weight % basis (based on the combined weight of acetyl groups divided by the entire cellulose ester polymer) can be at least 2, or at least 3, or at least 4, or at least 4.5 wt. %. Additionally or in the alternative, the acetyl group content can be up to 50, or up to 45, or up to 40, or up to 30 wt. %, or up to 25, or up to 20, or up to 15, or up to 10, or up to 8, or up to 6, or up to 5 wt. %. Suitable ranges include, by wt. %, from 2-50, or 2-45, or 2-40, or 2-35, or 2-30, or 2 to 25, or 2-20, or 2-15, or 2-10, or 2-8, or 2-6, or 2-5, or 3-50, or 3-45, or 3-40, or 3-35, or 3-30, or 3 to 25, or 3-20, or 3-15, or 3-10, or 3-8, or 3-6, or 3-5, or 4-50, or 4-45, or 4-40, or 4-35, or 4-30, or 4-25, or 4-20, or 4-15, or 4-10, or 4-8, or 4-6, or 4-5, or 4.5-50, or 4.5-45, or 4.5-40, or 4.5-35, or 4.5-30, or 4.5-25, or 4.5-20, or 4.5-15, or 4.5-10, or 4.5-8, or 4.5-6, or 4.5-5 wt. %.

The acetyl DS/AGU in a CE can be at least greater than 0, or at least 0.05, or at least 0.1, or at least 0.15, or at least 0.2. Additionally, or in the alternative, the DS/AGU of the acetyl groups in a CE can be up to 6, or up to 5, or up to 4, or up to 3.7, or up to 3.5, or up to 3.2, or up to 3.1, or up to 3.04, or up to 3, or up to 2.995, or up to 2.95, or up to 2.9, or up to 2.88, or up to 2.85. Suitable ranges of the DS/AGU of acetyl groups in a CE include greater than 0-6, or greater than 0 to 5, or greater than 0 to 4, or greater than 0 to 3.7, or greater than 0 to 3.5, or greater than 0 to 3.2, or greater than 0 to 3.04, or greater than 0 to 3, or greater than 0 to 2.995, or greater than 0 to 2.95, or greater than 0 to 2.9, or greater than 0 to 2.88, or greater than 0 to 2.85, or 0.05 to 6, or 0.05 to 5, or 0.05 to 4, or 0.05 to 3.7, or 0.05 to 3.5, or 0.05 to 3.2, or 0.05 to 3.1, or 0.05 to 3, or 0.05 to 2.995, or 0.05 to 2.95, or 0.05 to 2.9, or 0.05 to 2.88, or 0.05 to 2.85, or 0.1 to 6, or 0.1 to 5, or 0.1 to 4, or 0.1 to 3.7, or 0.1 to 3.5, or 0.1 to 3.2, or 0.1 to 3.1, or 0.1 to 3, or 0.1 to 2.995, or 0.1 to 2.95, or 0.1 to 2.9, or 0.1 to 2.88, or 0.1 to 2.85, or 0.15 to 6, or 0.15 to 5, or 0.15 to 4, or 0.15 to 3.7, or 0.15 to 3.5, or 0.15 to 3.2, or 0.15 to 3.1, or 0.15 to 3, or 0.15 to 2.995, or 0.15 to 2.95, or 0.15 to 2.9, or 0.15 to 2.88, or 0.15 to 2.85, or 0.2 to 6, or 0.2 to 5, or 0.2 to 4, or 0.2 to 3.7, or 0.2 to 3.5, or 0.2 to 3.2, or 0.2 to 3.1, or 0.2 to 3, or 0.2 to 2.995, or 0.2 to 2.95, or 0.2 to 2.9, or 0.2 to 2.88, or 0.2 to 2.85.

In a CE that is a cellulose acetate (one that is not mixed with any R groups other than acetyl), the amount of acetyl groups by weight percentage can be at least 20, or at least 25, or at least 30, or at least 35, or at least 40 wt %. Additionally, or alternatively, the amount of acetyl groups by weight percentage can be up to 50, or up to 45, or up to 40. Suitable ranges in a cellulose acetate, by wt. %, include 20-50, or 20-45, or 20-40, or 25-50, or 25-45, or 25-40, or 30-50, or 30-45, or 30-40, or 35-50, or 35-45, or 35-40 wt. %. Generally, the weight percentage will be at least 30 or at least 35 and up to 45 or up to 40.

The DS/AGU of the acetyl groups in a cellulose acetate can be at least 1.8, or at least 2, or at least 2.5, or at least 2.7, or at least 2.9, or at least 3, or at least 3.1, or at least 3.2. The cellulose acetate can have a DS/AGU for acetyl groups up to 5, or up to 4, or up to 3.7, or up to 3.5, or up to 3.2, or up to 3.1, or up to 3.04. Suitable ranges of the DS/AGU of acetyl groups in a cellulose acetate include 1.8 to 5, or 1.8 to 4, or 1.8 to 3.7, or 1.8 to 3.5, or 1.8 to 3.2, or 1.8 to 3.1, or 1.8 to 5, or 1.8 to 4, or 1.8 to 3.7, or 1.8 to 3.5, or 1.8 to 3.2, or 1.8 to 3.1, or 2 to 5, or 2 to 4, or 2 to 3.7, or 2 to 3.5, or 2 to 3.2, or 2 to 3.1, or 2.5 to 5, or 2.5 to 4, or 2.5 to 3.7, or 2.5 to 3.5, or 2.5 to 3.2, or 2.5 to 3.1, or 2.7 to 5, or 2.7 to 4, or 2.7 to 3.7, or 2.7 to 3.5, or 2.7 to 3.2, or 2.7 to 3.1, or 2.9 to 5, or 2.9 to 4, or 2.9 to 3.7, or 2.9 to 3.5, or 2.9 to 3.2, or 2.9 to 3.1, or 3 to 5, or 3 to 4, or 3 to 3.7, or 3 to 3.5, or 3 to 3.2, or 3 to 3.1, or 3.1 to 5, or 3.1 to 4, or 3.1 to 3.7, or 3.1 to 3.5, or 3.1 to 3.2, or 3.2 to 5, or 3.2 to 4, or 3.2 to 3.7, or 3.2 to 3.5.

A mixed CE can have propionyl groups, where R=3. The weight percentage of propionyl groups (R=3 divided by the weight of the entire CE polymer) in a mixed CE can be from at least 15, or at least 20, or at least 25, or at least 30, or at least 35, or at least 40, or at least 45, and up to 60, or up to 57, or up to 55, or up to 52. Suitable ranges of the weight % of the propionyl groups ranges from 15 to 60, or 15-57, or 15-55, or 15-52, or 20 to 60, or 20-57, or 20-55, or 20-52, or 20-50, or 20-48, or 20-46, or 25-60, or 25-57, or 25-55, or 25-52, or 25-50, or 25-48, or 25-46, or 30 to 60, or 30-57, or 30-55, or 30-52, or 30-50, or 30-48, or 30-46, or 35 to 60, or 35-57, or 35-55, or 35-52, or 37-50, or 37-48, or 37-46, or 37 to 60, or 37-57, or 37-55, or 37-52, or 37-50, or 37-48, or 37-46, or 39 to 60, or 39-57, or 39-55, or 39-52, or 39-50, or 39-48, or 39-46, or 40 to 60, or 40-57, or 40-55, or 40-52, or 40-50, or 40-48, or 40-46, or 45 to 60, or 45-57, or 45-55, or 45-52 wt. %. Generally the wt. % of the propionyl groups in a mixed CE will be toward the upper end of these ranges, e.g. 30 to 60, or 30-57, or 30-55, or 30-52, or 35 to 60, or 35-57, or 35-55, or 35-52, or 40 to 60, or 40-57, or 40-55, or 40-52, or 45 to 60, or 45-57, or 45-55, or 45-52 wt. %.

The DS/AGU of the R=3 propionyl groups in a mixed CE can be up to 3.5, or up to 3.3, or up to 3.2, or up to 3, or up to 2.95, or up to 2.9, or up to 1.1, or up to 1.05, or up to 1, or up to 0.95 or up to 0.9, or up to 0.85, or up to 0.8, or up to 0.7, or up to 0.6, or up to 0.5, or up to 0.4, or up to 0.35, or up to 0.3, or up to 0.25, or up 2.85, or up to 2.8, or up to 2.75, or up to 2.6, or up to 2.5, or up to 2.45, or up to 2.4, or up to 2.35, or up to 2.3 . The DS/AGU of the propionyl groups can be zero, or at least 0.6, or at least 0.7, or at least 1, or at least 1.5, or at least 1.7, or at least 1.8, or at least 1.9, or at least 2, or at least 2.3, or at least 2.4, or at least 2.5, or at least 2.6, or at least 2.65, or at least 2.7. The range of DS/AGU of propionyl groups in a mixed CE can 0 to 3.5, or 0 to 3.3, or 0 to 3.2, or 0 to 3, or 0 to 2.95, or 0 to 2.9, or 0, to 2.85, or 0 to 2.8, or 0 to 2.75, or 0 to 2.6, or 0 to 2.5, or up to 2.45, or up to 2.4, or up to 2.35, or up to 2.3, or 0.6 to 3.5, or 0.6 to 3.3, or 0.6 to 3.2, or 0.6 to 3, or 0.6 to 2.95, or 0.6 to 2.9, or 0.6, to 2.85, or 0.6 to 2.8, or 0.6 to 2.75, or 0.6 to 2.6, or 0.6 to 2.5, or 0.6 to 2.45, or 0.6 to 2.4, or 0.6 to 2.35, or 0.6 to 2.3, or 0.7 to 3.5, or 0.7 to 3.3, or 0.7 to 3.2, or 0.7 to 3, or 0.7 to 2.95, or 0.7 to 2.9, or 0.7 to 2.85, or 0.7 to 2.8, or 0.7 to 2.6, or 0.7 to 2.5, or 0.7 to 2.45, or 0.7 to 2.4, or 0.7 to 2.35, or 0.7 to 2.3, or 0.8 to 3.5, or 0.8 to 3.3, or 0.8 to 2.7, or 1 to 3.5, or 1 to 3.3, or 1 to 3.2, or 1 to 3, or 1 to 2.95, or 1 to 2.9, or 1 to 2.85, or 1 to 2.8, or 1 to 2.75, or 1.5 to 3.5, or 1.5 to 3.3, or 1.5 to 3.2, or 1.5 to 3, or 1.5 to 2.95, or 1.5 to 2.9, or 1.5, to 2.85, or 1.5 to 2.8, or 1.5 to 2.75, or 1.7 to 2.6, or 1.7 to 2.5, or 1.7 to 2.45, or 1.7 to 2.4, or 1.7 to 2.35, or 1.7 to 2.3, or 1.8 to 3, or 1.8 to 2.95, or 1.8 to 2.9, or 1.8, to 2.85, or 1.8 to 2.8, or 1.8 to 2.75, or 1.8 to 2.6, or 1.8 to 2.5, or 1.8 to 2.45, or 1.8 to 2.4, or 1.8 to 2.35, or 1.8 to 2.3, or 1.9 to 3, or 1.9 to 2.95, or 1.9 to 2.9, or 1.9, 2.85, or 1.9 to 2.8, or 1.9 to 2.75, or 1.9 to 2.6, or 1.9 to 2.5, or 1.9 to 2.45, or 1.9 to 2.4, or 1.9 to 2.35, or 1.9 to 2.3, or 2 to 3.5, or 2 to 3.3, or 2 to 3.2, or 2 to 3, or 2 to 2.95, or 2 to 2.9, or 2 to 2.85, or 2 to 2.8, or 2 to 2.75, or 2 to 2.6, or 2 to 2.5, or 2 to 2.45, or 2 to 2.4, or 2 to 2.35, or 2 to 2.3, or 2.3 to 3.5, or 2.3 to 3.3, or 2.3 to 3.2, or 2.3 to 3, or 2.3 to 2.95, or 2.3 to 2.9, or 2.3 to 2.85, or 2.3 to 2.8, or 2.3 to 2.75, or 2.3 to 2.6, or 2.3 to 2.5, or 2.3 to 2.45, or 2.5 to 3.5, or 2.5 to 3.3, or 2.5 to 3.2, or 2.5 to 3, or 2.5 to 2.95, or 2.5 to 2.9, or 2.5 to 2.85, or 2.5 to 2.8, or 2.5 to 2.75, or 2.6 to 3.5, or 2.6 to 3.3, or 2.6 to 3.2, or 2.6 to 3, or 2.6 to 2.95, or 2.6 to 2.9, or 2.6 to 2.85, or 2.6 to 2.8, or 2.6 to 2.75. Generally, the flexibility and compatibility of the CE with the poly(vinyl acetal) resin will improve as the propionyl DS/AGU increases. Desirably, the DS of propionyl groups in a mixed CE will toward the upper end of the mentioned ranges, e.g. 2.3 to 3.2, or 2.3 to 3, or 2.3 to 2.95, or 2.3 to 2.9, or 2.3 to 2.85, or 2.3 to 2.8, or 2.3 to 2.75, or 2.5 to 3.2, or 2.5 to 3, or 2.5 to 2.95, or 2.5 to 2.9, or 2.5 to 2.85, or 2.5 to 2.8, or 2.5 to 2.75, or 2.6 to 3.2, or 2.6 to 3, or 2.6 to 2.95, or 2.6 to 2.9, or 2.6 to 2.85, or 2.6 to 2.8, or 2.6 to 2.75.

A mixed cellulose ester can have propionyl groups, where R=3. The weight percentage of propionyl groups (R=3 divided by the weight of the entire cellulose ester polymer) in a mixed cellulose ester can be from at least 15, or at least 20, or at least 25, or at least 30, or at least 35, or at least 40, or at least 45, and up to 60, or up to 57, or up to 55, or up to 52. Suitable ranges of the weight % of the propionyl groups ranges from 15 to 60, or 15-57, or 15-55, or 15-52, or 20 to 60, or 20-57, or 20-55, or 20-52, or 25-60, or 25-57, or 25-55, or 25-52, or 30 to 60, or 30-57, or 30-55, or 30-52, or 35 to 60, or 35-57, or 35-55, or 35-52, or 40 to 60, or 40-57, or 40-55, or 40-52, or 45 to 60, or 45-57, or 45-55, or 45-52 wt. %. Generally the wt. % of the propionyl groups in a mixed cellulose ester will be toward the upper end of these ranges, e.g. 30 to 60, or 30-57, or 30-55, or 30-52, or 35 to 60, or 35-57, or 35-55, or 35-52, or 40 to 60, or 40-57, or 40-55, or 40-52, or 45 to 60, or 45-57, or 45-55, or 45-52 wt. %.

The DS/AGU of the R=3 propionyl groups in a mixed cellulose ester can be up to 3.5, or up to 3.3, or up to 3.2, or up to 3, or up to 2.95, or up to 2.9, or up to 1.1, or up to 1.05, or up to 1, or up to 0.95 or up to 0.9, or up to 0.85, or up to 0.8, or up to 0.7, or up to 0.6, or up to 0.5, or up to 0.4, or up to 0.35, or up to 0.3, or up to 0.25, or up 2.85, or up to 2.8, or up to 2.75. The DS/AGU of the propionyl groups can be zero, or at least 0.6, or at least 0.7, or at least 1, or at least 1.5, or at least 2, or at least 2.3, or at least 2.4, or at least 2.5, or at least 2.6, or at least 2.65, or at least 2.7. The range of DS/AGU of propionyl groups in a mixed cellulose ester can 0 to 3.5, or 0 to 3.3, or 0 to 3.2, or 0 to 3, or 0 to 2.95, or 0 to 2.9, or 0, to 2.85, or 0 to 2.8, or 0 to 2.75, or 0.6 to 3.5, or 0.6 to 3.3, or 0.6 to 3.2, or 0.6 to 3, or 0.6 to 2.95, or 0.6 to 2.9, or 0.6, to 2.85, or 0.6 to 2.8, or 0.6 to 2.75, or 0.7 to 3.5, or 0.7 to 3.3, or 0.7 to 3.2, or 0.7 to 3, or 0.7 to 2.95, or 0.7 to 2.9, or 0.7 to 2.85, or 0.7 to 2.8, or 0.8 to 3.5, or 0.8 to 3.3, or 0.7 to 2.7, or 1 to 3.5, or 1 to 3.3, or 1 to 3.2, or 1 to 3, or 1 to 2.95, or 1 to 2.9, or 1 to 2.85, or 1 to 2.8, or 1 to 2.75, or 1.5 to 3.5, or 1.5 to 3.3, or 1.5 to 3.2, or 1.5 to 3, or 1.5 to 2.95, or 1.5 to 2.9, or 1.5, to 2.85, or 1.5 to 2.8, or 1.5 to 2.75, or 2 to 3.5, or 2 to 3.3, or 2 to 3.2, or 2 to 3, or 2 to 2.95, or 2 to 2.9, or 2 to 2.85, or 2 to 2.8, or 2 to 2.75, or 2.3 to 3.5, or 2.3 to 3.3, or 2.3 to 3.2, or 2.3 to 3, or 2.3 to 2.95, or 2.3 to 2.9, or 2.3 to 2.85, or 2.3 to 2.8, or 2.3 to 2.75, or 2.5 to 3.5, or 2.5 to 3.3, or 2.5 to 3.2, or 2.5 to 3, or 2.5 to 2.95, or 2.5 to 2.9, or 2.5 to 2.85, or 2.5 to 2.8, or 2.5 to 2.75, or 2.6 to 3.5, or 2.6 to 3.3, or 2.6 to 3.2, or 2.6 to 3, or 2.6 to 2.95, or 2.6 to 2.9, or 2.6 to 2.85, or 2.6 to 2.8, or 2.6 to 2.75. Generally, the flexibility and compatibility of the CE with the poly(vinyl acetal) layer will improve as the propionyl DS/AGU increases. Desirably, the DS of propionyl groups in a mixed cellulose ester will toward the upper end of the mentioned ranges, e.g. 2.3 to 3.2, or 2.3 to 3, or 2.3 to 2.95, or 2.3 to 2.9, or 2.3 to 2.85, or 2.3 to 2.8, or 2.3 to 2.75, or 2.5 to 3.2, or 2.5 to 3, or 2.5 to 2.95, or 2.5 to 2.9, or 2.5 to 2.85, or 2.5 to 2.8, or 2.5 to 2.75, or 2.6 to 3.2, or 2.6 to 3, or 2.6 to 2.95, or 2.6 to 2.9, or 2.6 to 2.85, or 2.6 to 2.8, or 2.6 to 2.75.

A mixed cellulose ester can have butyryl groups, where R=4. The weight percentage of propionyl groups (R=4 divided by the weight of the entire cellulose ester polymer) in a mixed cellulose ester can be from at least 15, or at least 20, or at least 25, or at least 30, or at least 35, or at least 40, or at least 45, and up to 60, or up to 57, or up to 55, or up to 52. Suitable ranges of the weight % of the butyryl groups ranges from 15 to 60, or 15-57, or 15-55, or 15-52, or 20 to 60, or 20-57, or 20-55, or 20-52, or 25-60, or 25-57, or 25-55, or 25-52, or 30 to 60, or 30-57, or 30-55, or 30-52, or 35 to 60, or 35-57, or 35-55, or 35-52, or 40 to 60, or 40-57, or 40-55, or 40-52, or 45 to 60, or 45-57, or 45-55, or 45-52 wt. %. Generally, the weight % of the butyryl groups in a mixed cellulose ester will be toward the upper end of these ranges, e.g. 30 to 60, or 30-57, or 30-55, or 30-52, or 35 to 60, or 35-57, or 35-55, or 35-52, or 40 to 60, or 40-57, or 40-55, or 40-52, or 45 to 60, or 45-57, or 45-55, or 45-52 wt. %.

The DS/AGU of the R=4 butyryl groups in a mixed cellulose ester can be up to 3.2, or up to 3, or up to 2.95, or up to 2.9, or up to 1.1, or up to 1.05, or up to 1, or up to 0.95 or up to 0.9, or up to 0.85, or up to 0.8, or up to 0.7, or up to 0.6, or up to 0.5, or up to 0.4, or up to 0.35, or up to 0.3, or up to 0.25, or up 2.85, or up to 2.8, or up to 2.75. The DS of the butyryl groups can be at least 0.6, or at least 0.7, or at least 1, or at least 1.5, or at least 2, or at least 2.3, or at least 2.4, or at least 2.5, or at least 2.6, or at least 2.65, or at least 2.7. The range of DS/AGU of acetyl groups in a mixed cellulose ester can 0-3.2, or 0-3, or 0-2.95, or 0-2.9, or 0-2.85, or 0-2.8, or 0-2.7, or 0.6 to 3.2, or 0.6 to 3, or 0.6 to 2.95, or 0.6 to 2.9, or 0.6, to 2.85, or 0.6 to 2.8, or 0.6 to 2.75, or 0.7 to 3.2, or 0.7 to 3, or 0.7 to 2.95, or 0.7 to 2.9, or 0.7 to 2.85, or 0.7 to 2.8, or 0.7 to 2.7, 1 to 3.2, or 1 to 3, or 1 to 2.95, or 1 to 2.9, or 1 to 2.85, or 1 to 2.8, or 1 to 2.75, or 1.5 to 3.2, or 1.5 to 3, or 1.5 to 2.95, or 1.5 to 2.9, or 1.5, to 2.85, or 1.5 to 2.8, or 1.5 to 2.75, or 2 to 3.2, or 2 to 3, or 2 to 2.95, or 2 to 2.9, or 2 to 2.85, or 2 to 2.8, or 2 to 2.75, or 2.3 to 3.2, or 2.3 to 3, or 2.3 to 2.95, or 2.3 to 2.9, or 2.3 to 2.85, or 2.3 to 2.8, or 2.3 to 2.75, or 2.5 to 3.2, or 2.5 to 3, or 2.5 to 2.95, or 2.5 to 2.9, or 2.5 to 2.85, or 2.5 to 2.8, or 2.5 to 2.75, or 2.6 to 3.2, or 2.6 to 3, or 2.6 to 2.95, or 2.6 to 2.9, or 2.6 to 2.85, or 2.6 to 2.8, or 2.6 to 2.75. Generally, the flexibility and compatibility of the CE with the poly (vinyl acetal) layer will improve as the butyryl DS/AGU increases. Desirably, the DS/AGU of butyryl groups will toward the upper end of the mentioned ranges, e.g. 2.3 to 3.2, or 2.3 to 3, or 2.3 to 2.95, or 2.3 to 2.9, or 2.3 to 2.85, or 2.3 to 2.8, or 2.3 to 2.75, or 2.5 to 3.2, or 2.5 to 3, or 2.5 to 2.95, or 2.5 to 2.9, or 2.5 to 2.85, or 2.5 to 2.8, or 2.5 to 2.75, or 2.6 to 3.2, or 2.6 to 3, or 2.6 to 2.95, or 2.6 to 2.9, or 2.6 to 2.85, or 2.6 to 2.8, or 2.6 to 2.75.

The cellulose esters useful in the present invention can have a number average molecular weight ($M_n$) of at least about 12,000, or at least 15,000, or at least 20,000, or at least 25,000, or at least 30,000, or at least 35,000, or at least 40,000, or at least 45,000, or at least 50,000, or at about 55,000, or at least about 60,000, or at least about 65,000, or at least about 70,000 and in each case up to about 120,000, or up to about 100,000, or up to about 85,000. The Mn values are polystyrene-equivalent molecular weights determined using size exclusion chromatography. Suitable Mn ranges include 12,000-120,000, or 12,000-100,000, or 12,000-85,000, or 15.000-120,000, or 15,000-100,000, or 15,000-85,000, or 20,000-120,000, or 20,000-100,000, or 20,000-85,000, or 25,000-120,000, or 25,000-100,000, or 25,000-85,000, or 30,000-120,000, or 30,000-100,000, or 30,000-85,000, or 35,000-120,000, or 35,000-100,000, or 35,000-85,000, or 40,000-120,000, or 40,000-100,000, or 40,000-85,000, or 45,000-120,000, or 45,000-100,000, or 45,000-85,000, or 50,000-120,000, or 50,000-100,000, or 50,000-85,000, or 55,000-120,000, or 55,000-100,000, or 55,000-85,000, or 60,000-120,000, or 60,000-100,000, or 60,000-85,000.

Desirably, the CE employed is at a higher molecular weight to improve the toughness, flexibility, and impact strength of the CE layer. Accordingly, CE's that have molecular weights of at least 40,000, or even at least 50,000, and at least 60,000, and in each case up to 120,000 or up to 100,000 or up to 85,000 are desirable to obtain one or more of these properties.

The cellulose esters can have a glass transition temperature ("Tg") of at least about 55° C., or at least about 60° C., or at least about 70° C., or at least about 75° C., or at least about 80° C., or at least about 85° C., or at least about 90° C., or at least about 95° C., or at least about 100° C., or at least about 110° C., or at least about 120° C., or at least about 130° C., or at least 140° C., and up to 220° C., or up to 210° C., or up to 200° C., or up to 190° C., or up to 180° C. The Tg of the CE layer is determined by a different method than the Tg of the poly(vinyl acetal) layer. The Tg of the CE layer is determined by differential scanning calorimetry at 10° C./minute scan rate, second heat scan, at the mid-point of the glass transition. Suitable ranges include 55-220, or 55-210, or 55-200, or 55-190, or 55-180, or 55-180, or 65-220, or 65-210, or 65-200, or 65-190, or 65-180, or 85-220, or 85-210, or 85-200, or 85-190, or 85-180, 100-220, or 100-210, or 100-200, or 100-190, or 100-180, or 110-220, or 110-210, or 110-200, or 110-190, or 110-180, or 120-220, or 120-210, or 120-200, or 120-190, or 120-180, or 130-220, or 130-210, or 130-200, or 130-190, or 130-180, or 140-220, or 140-210, or 140-200, or 140-190, or 140-180.

Desirable ranges of Tg to give the CE layer stiffness and rigidity are those having a Tg of at least 100° C., or at least 110° C., or at least 120° C., or at least 130° C.

The degree of polymerization ("DP") as used herein refers to the number of AGUs per molecule of cellulose ester. The DP is not particularly limited, although it is desirable to employ cellulose esters having a combination of hydroxyl content and sufficiently high molecular weight to be film forming. In one embodiment of the invention, the cellulose esters can have a DP of at least about 110, or at least about 120, or at least about 130, or at least about 140, or at least about 150, or at least about 160, or at least about 170, or at least about 180, or at least about 190, or at least about 200, or at least about 210, or at least about 220, or at least about 230, or at least about 240, and up to about 350, or up to about 325, or up to about 300.

The CEs can have a falling ball viscosity of at least about 0.005, or at least 0.01, or at least 0.05, or at least 0.1, or at least 0.5, or at least 1, or at least 1.5, or at least 2, or at least 4, or at least 5, or at least 7, or at least 10, or at least 12, or at least 15, and up to 50, or up to 45, or up to 40, or up to 35, or up to 30, or up to 25 pascals-second ("Pas") as measured by ASTM D817, Formula A. Suitable ranges of viscosity include 0.005 to 50, or 0.005 to 35, or 0.01 to 50, or 0.01 to 35, or 0.01 to 30, or 0.01 to 25, or 0.01 to 20, or 0.01 to 15, or 0.01 to 10, or 0.01 to 7, or 0.01 to 6, or 0.01 to 5, or 0.01 to 4, or 0.01 to 3, or 0.01 to 2, or 0.01 to 1, or 0.2 to 50, or 0.2 to 35, or 0.2 to 30, or 0.2 to 25, or 0.2 to 25, or 0.2 to 20, or 0.2 to 15, or 0.2 to 10, or 0.2 to 7, or 0.2 to 6, or 0.2 to 5, or 0.2 to 4, or 0.2 to 3, or 0.2 to 2, or 0.2 to 1, or 1.5 to 50, or 1.5 to 40, or 1.5 to 35, or 1.5 to 30, or 1.5 to 25, or 1.5 to 20, or 1.5 to 15, or 1.5 to 10, or 1.5 to 7, or 1.5 to 6, or 1.5 to 5, or 1.5 to 4, or 1.5 to 3, or 1.5 to 2, or 2 to 50, or 2 to 35, or 2 to 30, or 2 to 25, or 2 to 25, or 2 to 20, or 2 to 15, or 2 to 10, or 2 to 7, or 2 to 6, or 2 to 5, or 2 to 4, or 2 to 3, or 4 to 50, or 4 to 35, or 4 to 30, or 4 to 25, or 4 to 25, or 4 to 20, or 4 to 15, or 4 to 10, or 4 to 7, or 4 to 6, or 4 to 5, or 5 to 50, or 5 to 35, or 5 to 30, or 5 to 25, or 5 to 25, or 5 to 20, or 5 to 15, or 5 to 10, or 5 to 7, or 5 to 6, or 10 to 50, or 10 to 45, or 10 to 40, or 10 to 35, or 10 to 30, or 10 to 25, or 10 to 25, or 10 to 20, or 10 to 15, or 12 to 50, or 12 to 45, or 12 to 40, or 12 to 35, or 12 to 30, or 12 to 30, or 12 to 25, or 12 to 25, or 12 to 20, or 12 to 15, or 15 to 50, or 15 to 45, or 15 to 40, or 15 to 35 or 15 to 30, or 15 to 25 or 15 to 25, or 15 to 20.

The cellulose esters desirably have not previously been subjected to fibrillation or any other fiber-producing process. The cellulose esters are not in the form of fibrils and can be referred to as "non-fibril."

At least one CE layer is disposed between the first and second poly(vinyl acetal) layers and has a thickness of at least 1 mil, or at least 5 mils, or at least 10 mils. Desirably, the CE layer has a thickness of at least 5 mils, or at least 10 mils, or at least 11 mils, or at least 12 mils, or at least 13 mils, or at least 14 mils, or at least 15 mils, or at least 16 mils, or at least 17 mils, or at least 17 mils, or at least 18 mils, or at least 19 mils, or at least 20 mils, or at least 21 mils, or at least 22 mils, or at least 23 mils, or at least 24 mils, or at least 25 mils. Additionally or in the alternative, the CE layer can have a thickness of up to 2000 mils, or up to 1000 mils, or up to 500 mils, or up to 100 mils, or up to 80 mils, or up to 50 mils, or up to 45 mils, or up to 40 mils, or up to 35 mils, or up to 30 mils. Suitable ranges include 10-2000, or 10-1000, or 10-500, or 10-100, or 10-80, or 10-50, or 10-45, or 10-40, or 10-35, or 10-30, or 11-2000, or 11-1000, or 11-500, or 11-100, or 11-80, or 11-50, or 11-45, or 11-40, or 11-35, or 11-30, or 12-2000, or 12-1000, or 12-500, or 12-100, or 12-80, or 12-50, or 12-45, or 12-40, or 12-35, or 12-30, or 13-2000, or 13-1000, or 13-500, or 13-100, or 13-80, or 13-50, or 13-45, or 13-40, or 13-35, or 13-30, or 14-2000, or 14-1000, or 14-500, or 14-100, or 14-80, or 14-50, or 14-45, or 14-40, or 14-35, or 14-30, or 15-2000, or 15-1000, or 15-500, or 15-100, or 15-80, or 15-50, or 15-45, or 15-40, or 15-35, or 15-30, or 16-2000, or 16-1000, or 16-500, or 16-100, or 16-80, or 16-50, or 16-45, or 16-40, or 16-35, or 16-30, or 17-2000, or 17-1000, or 17-500, or 17-100, or 17-80, or 17-50, or 17-45, or 17-40, or 17-35, or 17-30, or 18-2000, or 18-1000, or 18-500, or 18-100, or 18-80, or 18-50, or 18-45, or 18-40, or 18-35, or 18-30, or 19-2000, or 19-1000, or 19-500, or 19-100, or 19-80, or 19-50, or 19-45, or 19-40, or 19-35, or 19-30, or 20-2000, or 20-1000, or 20-500, or 20-100, or 20-80, or 20-50, or 20-45, or 20-40, or 20-35, or 20-30, or 21-2000, or 21-1000, or 21-500, or 21-100, or 21-80, or 21-50, or 21-45, or 21-40, or 21-35, or 21-30, or 22-2000, or 22-1000, or 22-500, or 22-100, or 22-80, or 22-50, or 22-45, or 22-40, or 22-35, or 22-30, or 23-2000, or 23-1000, or 23-500, or 23-100, or 23-80, or 23-50, or 23-45, or 23-40, or 23-35, or 23-30, or 24-2000, or 24-1000, or 24-500, or 24-100, or 24-80, or 24-50, or 24-45, or 24-40, or 24-35, or 24-30, or 25-2000, or 25-1000, or 25-500, or 25-100, or 25-80, or 25-50, or 25-45, or 25-40, or 25-35, or 25-30, in each case mils. For most applications, the thickness of the CE layer can be from 10-100, or 10-80, or 10-50, or 10-45, or 10-40, or 10-35, or 12-100, or 12-80, or 12-50, or 12-45, or 12-40, or 12-35, or 15-100, or 15-80, or 15-50, or 15-45, or 15-40, or 15-35, or 18-100, or 18-80, or 18-50, or 18-45, or 18-40, or 18-35, or 20-100, or 20-80, or 20-50, or 20-45, or 20-40, or 20-35, or 23-100, or 23-80, or 23-50, or 23-45, or 23-40, or 23-35, or 25-100, or 25-80, or 25-50, or 25-45, or 25-40, or 25-35, in each case mils.

At least one CE layer desirably has a E' storage modulus, of at least 200,000,000 pascals, or at least 300,000,000 pascals, or at least 400,000,000 pascals, or at least 500,000,000 pascals, or at least 600,000,000 pascals, or at least 700,000,000 pascals, or at least 800,000,000 pascals, or at least 900,000,000 pascals, or at least 1,000,000,000 pascals. There is no particular upper limit, although practically the CE layers or a one or more core layers of the multilayer interlayer can obtain a E' storage modulus as high as 3,000,000,000 pascals, or as high as 2,000,000,000.

The cellulose esters can be produced by any method known in the art. Examples of processes for producing cellulose esters are taught in Kirk-Othmer, Encyclopedia of Chemical Technology, 5th Edition, Vol. 5, Wiley-Interscience, New York (2004), pp. 394-444. Cellulose, the starting material for producing cellulose esters, can be obtained in different grades and from sources such as, for example, cotton linters, softwood pulp, hardwood pulp, corn fiber and other agricultural sources, and bacterial celluloses.

One method of producing cellulose esters is by esterification. In such a method, the cellulose is mixed with the appropriate organic acids, acid anhydrides, and catalysts and then converted to a cellulose triester. Ester hydrolysis is then performed by adding a water-acid mixture to the cellulose triester, which can be filtered to remove any gel particles or fibers. Water is added to the mixture to precipitate out the cellulose ester. The cellulose ester can be washed with water to remove reaction by-products followed by dewatering and drying.

The cellulose triesters that are hydrolyzed can have three substituents selected independently from alkanoyls having from 2 to 10 carbon atoms. Examples of cellulose triesters include cellulose triacetate, cellulose tripropionate, and cellulose tributyrate or mixed triesters of cellulose such as cellulose acetate propionate and cellulose acetate butyrate. These cellulose triesters can be prepared by a number of methods known to those skilled in the art. For example, cellulose triesters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

Those skilled in the art will understand that the commercial term of cellulose triesters also encompasses cellulose esters that are not completely substituted with acyl groups. For example, cellulose triacetate commercially available from Eastman Chemical Company, Inc., Kingsport, Tenn., U.S.A., typically has a DS from about 2.85 to about 2.95.

After esterification of the cellulose to the triester, part of the acyl substituents can be removed by hydrolysis or by alcoholysis to give a secondary cellulose ester. Secondary cellulose esters can also be prepared directly with no hydrolysis by using a limiting amount of acylating reagent. This process is particularly useful when the reaction is conducted in a solvent that will dissolve cellulose.

The polydispersity of the CE is not particularly limited. The polydispersity can be range from 1 to 4, or 1 to 3.7, or from 1.1 to 3.7, or from 1.2 to 3.5, or from 1.2 to 3.3.

Additional examples of suitable CE's that can be used in the CE layer are as set forth in Table 2.

TABLE 2

| Example | Total DS/AGU | OH wt. % | Acetyl DS/AGU | Propionyl DS/AGU or Butyryl DS/AGU | Mn × 1000 | Tg ° C. | Falling Ball Viscosity |
|---|---|---|---|---|---|---|---|
| 1 | 1.5-6 | 0.5-6 | >0-6 | 0-3.5 | 12-120 | 85-220 | 0.005-50 |
| 2 | 2-4 | 0.5-5 | 0.05-3.5 | 0-3.5 | 12-85 | 85-200 | 0.01-40 |
| 3 | 2-3.1 | 0.5-3 | 0.05 to 1 | 1.5-2.95 | 15-100 | 110-210 | 0.01-40 |
| 4 | 2-3 | 0.5-2 | 0.1-1 | 1.5-2.90 | 15-85 | 110-190 | 0.01-40 |
| 5 | 2.4-2.995 | 0.7-6 | >0-0.6 | 2.3-2.95 | 15-85 | 110-190 | 4-50 |
| 6 | 2.4-3 | 0.7-6 | >0-0.6 | 2.3-2.95 | 20-120 | 120-190 | 4-50 |
| 7 | 2.4-2.995 | 0.7-5 | 0.1-0.3 | 2.3-2.85 | 20-85 | 120-190 | 5-40 |
| 8 | 2.4-3 | 0.7-3 | >0-0.4 | 2.3-2.95 | 30-100 | 130-190 | 5-40 |
| 9 | 2.4-2.995 | 0.7-3 | 0.1-0.3 | 2.3-2.95 | 30-85 | 130-180 | 5-40 |
| 10 | 2.5-3 | 0.7-6 | >0-0.4 | 2.3-2.95 | 40-120 | 120-180 | 10-40 |
| 11 | 2.5-2.995 | 0.7-5 | >0-0.3 | 2.3-2.95 | 40-100 | 130-180 | 10-35 |
| 12 | 2.5-2.95 | 0.7-2.3 | >0-0.4 | 2.3-2.9 | 40-85 | 130-190 | 10-40 |
| 13 | 2.6-3.3 | 0.7-6 | 2.6-3.3 | 0 | 12-85 | 120-200 | 5-50 |
| 14 | 2.6-3.1 | 0.7-5 | >0-0.4 | 2-2.95 | 12-100 | 120-190 | 10-40 |
| 15 | 2.6-3 | 0.7-5 | >0-0.4 | 2.3-2.95 | 50-85 | 130-190 | 12-35 |
| 16 | 2.6-2.995 | 0.7-3 | >0-0.4 | 2.3-2.95 | 50-85 | 130-190 | 12-35 |
| 17 | 2.6-2.95 | 0.7-3 | 0.1-0.3 | 2.3-2.85 | 50-85 | 130-190 | 12-35 |
| 18 | 2.7-3.0 | 0.7-6 | 0.1-0.5 | 2.3-2.9 | 30-120 | 120-200 | 5-50 |
| 19 | 2.7-3.3 | 0.7-6 | 0.1-3.3 | 0-2.95 | 12-100 | 120-190 | 5-40 |
| 20 | 2.7-3.0 | 0.7-5 | >0-0.4 | 2.3-2.95 | 30-100 | 130-190 | 5-40 |
| 21 | 2.7-3 | 0.7-3 | 0.1-0.3 | 2.3-2.95 | 50-100 | 130-190 | 5-40 |
| 22 | 2.7-2.995 | 0.7-2 | >0-0.4 | 2.3-2.95 | 50-85 | 140-190 | 10-35 |
| 23 | 2.7-2.95 | 0.7-3 | 0.1-0.3 | 2.3-2.85 | 60-85 | 140-180 | 12-35 |
| 24 | 2.6-3 | 0.7-3 | >0-0.4 | 2.3-2.95 | 60-85 | 130-190 | 5-40 |

Yet further example of suitable cellulose esters include:

A. a cellulose ester having a total DS/AGU of from 2.5-3, an OH wt. % of not more than 4 wt. %, a propionyl or butyryl DS/AGU from 2.3-3, and an acetyl DS/AGU from about 0.05 to 0.4; a number average molecular weight of from about 30,000 to about 100,000; and a Tg of at least 80; or B. a cellulose ester having a total DS/AGU from 2.5-3, a propionyl DS/AGU from 2.5-2.95, an acetyl DS/AGU from 0.05 to 0.4, and Mn of 40,000 to 85,000; or C. a CE having a total DS/AGU of at least 2.5; a propionyl or butyryl DS/AGU from 1.8-2.5 or from 1.8 to 2.35; an acetyl DS/AGU of up to 0.35, or up to 0.25, or up to 0.2; and an OH wt. % of 3-6.; or D. a CE having acetyl groups in an amount of less than 4 wt. %, propionyl or butyryl groups in an amount of 39-46 wt. %, and OH groups in an amount of 3-6 wt. %.

The CE layers as used throughout this description and claims means an interlayer containing cellulose ester in any amount. The CE layer(s) desirably are predominately (50 wt. % or more based on all polymer and excluding plasticizers) cellulose esters. The compositions of the CE layers can contain CE in an amount of at least 10 wt. %, 60 wt. %, or at least 65 wt. %, or at least 70 wt. %, or at least 75 wt. %, or at least 80 wt. %, or at least 85 wt. %, or at least 90 wt. % or at least 95 wt. %, or at least 98 wt. %, based on the weight of all polymers (excluding plasticizers) in the layer. Further, the amount of CE in a CE layer can be at least 51 wt. %, or at least 60 wt. %, or at least 65 wt. %, or at least 70 wt. %, or at least 75 wt. %, or at least 80 wt. %, or at least 85 wt. %, or at least 90 wt. % or at least 95 wt. %, and up to 99 wt. %, based on the weight of all ingredients in the CE layer.

Desirably, in the cases where the CE layer does not comprise 100% CE based on all polymers in the CE layer, at least one other type of polymer is a poly(vinyl acetal) as described above. The amount of poly(vinyl acetal) blended with the CE in the CE layer can be the remainder of the polymers in the CE. For example the CE/poly(vinyl acetal) weight ratio, based on all the polymers in the CE layer excluding the plasticizer, can be 1:9, or 1.5:8.5, or 2:8, or 3:7, or 4:6, or 5:5, or 6:4, or 7:3, or 8:2, or 9:1.

Plasticizer

The poly(vinyl acetal) layer and/or the CE layer can be modified using one or more plasticizers. As used herein, the amount of plasticizer, or any other component in the multilayer interlayer, can be measured as parts per hundred parts resin (phr), on a weight per weight basis. For example, if 30 grams of plasticizer is added to 100 grams of a poly(vinyl acetal)r resin, then the plasticizer content of the resulting plasticized poly(vinyl acetal) would be 30 phr. As used herein, when the plasticizer content of the interlayer is given, the plasticizer content is determined with reference to the phr of the plasticizer in the corresponding poly(vinyl acetal) or CE.

The poly(vinyl acetal) layer(s), or the skin layers, can contain at least 15, or at least 17, or at least 20, or at least 23, or at least 25, or at least 27, or at least 30, or at least 32, or at least 35 phr plasticizer, and up to 80, or up to 70, or up to 60, or up to 50, or up to 45, or up to 40, or up to 35, or up to 30 phr plasticizer. Suitable ranges of plasticizer in phr within a poly(vinyl acetal) layer or any one or more of the skin layers include 15 to 80, or 15 to 70, or 15 to 60, or 15 to 50, or 15 to 45, or 15 to 40, or 15 to 35, or 15 to 30, 20 to 80, or 20 to 70, or 20 to 60, or 20 to 50, or 20 to 45, or 20 to 40, or 20 to 35, or 20 to 30, 25 to 80, or 25 to 70, or 25 to 60, or 25 to 50, or 25 to 45, or 25 to 40, or 25 to 35, or 25 to 30, 30 to 80, or 30 to 70, or 30 to 60, or 30 to 50, or 30 to 45, or 30 to 40, or 30 to 35, or 35 to 30, 35 to 80, or 35 to 70, or 35 to 60, or 35 to 50, or 35 to 45, or 35 to 40 phr plasticizer.

The CE layer(s) can contain at least 2, or at least 5, or at least 8, or at least 10, or at least 13, or at least 15, or at least 18, or at least 20 wt. % plasticizer, and up to 100, or up to 80, or up to 70, or up to 60, or up to 50, or up to 40, or up to 30, or up to 25, or up 20 wt. % plasticizer, based on the weight of the CE layer. Suitable ranges of plasticizer in wt. % within a CE layer or any one or more of the skin layers include 2 to 100, or 2 to 80, or 2 to 70, or 2 to 60, or 2 to 50, or 2 to 40, or 2 to 30, or 2 to 25, or 2 to 20, or 5 to 100, or 5 to 80, or 5 to 70, or 5 to 60, or 5 to 50, or 5 to 40, or 5 to 30, or 5 to 25, or 5 to 20, or 8 to 100, or 8 to 80, or 8 to 70, or 8 to 60, or 8 to 50, or 8 to 40, or 8 to 30, or 8 to 25, or 8 to 20, 10 to 100, or 10 to 80, or 10 to 70, or 10 to 60, or 10 to 50, or 10 to 40, or 10 to 30, or 10 to 25, or 10 to 20, or 15 to 100, or 15 to 80, or 15 to 70, or 15 to 60, or 15 to 50, or 15 to 40, or 15 to 30, or 15 to 25, or 15 to 20 wt. % plasticizer.

One of the advantages of the CE layer is that it can tolerate high loadings of plasticizer while maintaining acceptable stiffness/modulus, that is, a E' storage modulus that is at least higher than the E' storage modulus of the poly(vinyl acetal) layer if not significantly higher (e.g. at least 10%, or at least 15%, or at least 20%, or at least 30%, or at least 40% higher). Thus, high amounts of plasticizer in the CE layer described above is tolerable because the stiffness/modulus of CE layer will not drop below stiffness/modulus of the poly(vinyl acetal) layers. Further, the CE layer can tolerate the migration of a plasticizer from the poly(vinyl acetal) layer into a CE layer while continuing to maintain a modulus that is higher than the modulus of at least one of the poly(vinyl acetal) layers.

Accordingly, the multilayer interlayer can be structured with a poly(vinyl acetal)(HP)/CE(LP)/poly(vinyl acetal) (HP) structure, wherein LP is low plasticizer and HP is high plasticizer, each relative to the other.

The type of plasticizer used in any of the layers is not particularly limited, and can be the same or different. The plasticizer used for modification can be any that is known in the art that can reduce the melt temperature and/or the melt viscosity of the cellulose ester. The plasticizer can be either monomeric or polymeric in structure.

The plasticizer can be compound having a hydrocarbon segment of 30 or less, or 25 or less, or 20 or less, or 15 or less, or 12 or less, or 10 or less carbon atoms, and in each case at least 6 carbon atoms. Suitable conventional plasticizers for use in these interlayers include esters of a polybasic acid or a polyhydric alcohol, among others. Suitable plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, butyl ricinoleate, castor oil, dibutoxy ethyl phthalate, diethyl phthalate, dibutyl phthalate, trioctyl phosphate, triethyl glycol ester of coconut oil fatty acids, phenyl ethers of polyethylene oxide rosin derivatives, oil modified sebacic alkyd resins, tricresyl phosphate, and mixtures thereof. A desirable plasticizer is 3GEH.

Additionally, other plasticizers, such as high refractive index plasticizers, may also be used in the multilayered interlayer, either alone or in combination with another plasticizer. Examples of the high refractive index plasticizers include, but are not limited to, esters of a polybasic acid or a polyhydric alcohol, polyadipates, epoxides, phthalates, terephthalates, benzoates, toluates, mellitates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. Examples of more preferred high refractive index plasticizers are dipropylene glycol dibenzoates and tripropylene glycol dibenzoates.

Other useful plasticizers are triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate.

The plasticizer can be one or more esters comprising (i) at least one acid residue including residues of phthalic acid, adipic acid, trimellitic acid, succinic acid, benzoic acid, azelaic acid, terephthalic acid, isophthalic acid, butyric acid, glutaric acid, citric acid, and/or phosphoric acid; and (ii) alcohol residues comprising one or more residues of an aliphatic, cycloaliphatic, or aromatic alcohol containing up to about 20 carbon atoms.

The plasticizer can comprise alcohol residues containing residues selected from the following: stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

The plasticizer can be selected from at least one of the following: benzoates, phthalates, phosphates, arylene-bis (diaryl phosphate), and isophthalates. In another embodiment, the plasticizer comprises diethylene glycol dibenzoate, abbreviated herein as "DEGDB".

The plasticizer can comprise aliphatic polyesters containing C2-10 diacid residues such as, for example, malonic acid, succinic acid, glutaric acid, adipic acid, pimelic acid, suberic acid, azelaic acid, and sebacic acid; and C2-10 diol residues.

The plasticizer can comprise diol residues which can be residues of at least one of the following C2-C10 diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

The plasticizer can include polyglycols, such as, for example, polyethylene glycol, polypropylene glycol, and polybutylene glycol. These can range from low molecular weight dimers and trimers to high molecular weight oligomers and polymers. In one embodiment, the molecular weight of the polyglycol can range from about 200 to about 2,000.

The plasticizer can comprise at least one of the following: Resoflex® R296 plasticizer, Resoflex® 804 plasticizer, SHP (sorbitol hexapropionate), XPP (xylitol pentapropionate), XPA (xylitol pentaacetate), GPP (glucose pentaacetate), GPA (glucose pentapropionate), and APP (arabitol pentapropionate).

The plasticizer can comprise one or more of from about 5 to about 95 weight percent of a C2-C12 carbohydrate organic ester, wherein the carbohydrate comprises from about 1 to about 3 monosaccharide units; and from about 5 to about 95 weight percent of a C2-C12 polyol ester, wherein the polyol is derived from a C5 or C6 carbohydrate. In one embodiment, the polyol ester does not comprise or contain a polyol acetate or polyol acetates.

The plasticizer can comprise at least one carbohydrate ester and the carbohydrate portion of the carbohydrate ester is derived from one or more compounds selected from the group consisting of glucose, galactose, mannose, xylose, arabinose, lactose, fructose, sorbose, sucrose, cellobiose, cellotriose, and raffinose.

The plasticizer can comprise at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate, and β-glucose pentabutyrate.

The plasticizer can comprise at least one carbohydrate ester and the carbohydrate portion of the carbohydrate ester comprises an α-anomer, a β-anomer, or a mixture thereof.

The cellulose ester can be modified using one or more compatibilizers. The compatibilizer can comprise at least about 1, 2, 3, or 5 weight percent of the cellulose ester composition. Additionally or alternatively, the compatibilizer can comprise not more than about 40, 30, 25, or 20 weight percent of the cellulose ester composition.

When non-reactive compatibilizers are utilized, the compatibilizer can contain a first segment that is compatible with the cellulose ester and a second segment that is compatible with the poly(vinyl acetal). In this case, the first segment contains polar functional groups, which provide compatibility with the cellulose ester, including, but not limited to, such polar functional groups as ethers, esters, amides, alcohols, amines, ketones, and acetals. The first segment may include oligomers or polymers of the following: cellulose esters; cellulose ethers; polyoxyalkylene, such as, polyoxyethylene, polyoxypropylene, and polyoxybutylene; polyglycols, such as, polyethylene glycol, polypropylene glycol, and polybutylene glycol; polyesters, such as, polycaprolactone, polylactic acid, aliphatic polyesters, and aliphatic-aromatic copolyesters; polyacrylates and polymethacrylates; polyacetals; polyvinylpyrrolidone; polyvinyl acetate; and polyvinyl alcohol. In one embodiment, the first segment is polyoxyethylene or polyvinyl alcohol.

The second segment can be compatible with the poly (vinyl acetal) and contain nonpolar groups. The second segment can contain saturated and/or unsaturated hydrocarbon groups. In one embodiment, the second segment can be an oligomer or a polymer. In another embodiment, the second segment of the non-reactive compatibilizer is selected from the group consisting of polyolefins, polydienes, polyaromatics, and copolymers.

In one embodiment, the first and second segments of the non-reactive compatibilizers can be in a diblock, triblock, branched, or comb structure. In this embodiment, the molecular weight of the non-reactive compatibilizers can range from about 300 to about 20,000, 500 to about 10,000, or 1,000 to about 5,000. The segment ratio of the non-reactive compatibilizers can range from about 15 to about 85 percent polar first segments to about 15 to about 85 percent nonpolar second segments.

Examples of non-reactive compatibilizers include, but are not limited to, ethoxylated alcohols, ethoxylated alkylphenols, ethoxylated fatty acids, block polymers of propylene oxide and ethylene oxide, polyglycerol esters, polysaccharide esters, and sorbitan esters. Examples of ethoxylated alcohols are C11-C15 secondary alcohol ethoxylates, polyoxyethylene cetyl ether, polyoxyethylene stearyl ether, and C12-C14 natural liner alcohol ethoxylated with ethylene oxide. C11-C15 secondary ethyoxylates can be obtained as Dow Tergitol® 15S from the Dow Chemical Company. Polyoxyethlene cetyl ether and polyoxyethylene stearyl ether can be obtained from ICI Surfactants under the Brij® series of products. C12-C14 natural linear alcohol ethoxylated with ethylene oxide can be obtained from Hoechst Celanese under the Genapol® series of products. Examples of ethoxylated alkyl phenols include octylphenoxy poly (ethyleneoxy)ethanol and nonylphenoxy poly(ethyleneoxy) ethanol. Octylphenoxy poly(ethyleneoxy)ethanol can be obtained as Igepal® CA series of products from Rhodia, and nonylphenoxy poly(ethyleneoxy)ethanol can be obtained as Igepal CO series of products from Rhodia or as Tergitol® NP from Dow Chemical Company. Ethyoxylated fatty acids include polyethyleneglycol monostearate or monolaurate which can be obtained from Henkel under the Nopalcol® series of products. Block polymers of propylene oxide and ethylene oxide can be obtained under the Pluronic® series of products from BASF. Polyglycerol esters can be obtained from Stepan under the Drewpol® series of products. Polysaccharide esters can be obtained from Henkel under the Glucopon® series of products, which are alkyl polyglucosides. Sorbitan esters can be obtained from ICI under the Tween® series of products.

In another embodiment of the invention, the compatibilizer can be reactive. The reactive compatibilizer comprises a polymer or oligomer compatible with one component of the composition and functionality capable of reacting with another component of the composition. There are two types of reactive compatibilizers. The first reactive compatibilizer has a hydrocarbon chain that is compatible with nonpolar segments of the poly(vinyl acetal) and also has functionality capable of reacting with the cellulose ester. Such functional groups include, but are not limited to, carboxylic acids, anhydrides, acid chlorides, epoxides, and isocyanates. Specific examples of this type of reactive compatibilizer include, but are not limited to: long chain fatty acids, such as stearic acid (octadecanoic acid); long chain fatty acid chlorides, such as stearoyl chloride (octadecanoyl chloride); long chain fatty acid anhydrides, such as stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, such as terpolymers of ethylene, acrylic ester and maleic anhydride; and copolymers of glycidyl methacrylate with olefins and/or acrylic esters, such as terpolymers of ethylene, acrylic ester, and glycidyl methacrylate.

Reactive compatibilizers can be obtained as SMA® 3000 styrene maleic anhydride copolymer from Sartomer/Cray Valley, Eastman G-3015® maleic anhydride grafted polypropylene from Eastman Chemical Company, Epolene® E-43 maleic anhydride grafted polypropylene obtained from Westlake Chemical, Lotader® MAH 8200 random terpolymer of ethylene, acrylic ester, and maleic anhydride obtained from Arkema, Lotader® GMA AX 8900 random terpolymer of ethylene, acrylic ester, and glycidyl methacrylate, and Lotarder® GMA AX 8840 random terpolymer of ethylene, acrylic ester, and glycidyl methacrylate.

A glass panel made with a CE interlayer in a multilayer interlayer laminated between two glass substrates has good optical clarity. The clarity of multilayer interlayer laminated between glass substrates can be determined by measuring the haze value, which is a quantification of light not transmitted through the sheet glass panel containing the multilayer interlayer. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees.

The percent haze of a multilayer interlayer according to the invention, and of a glass panel containing the multilayer interlayer of the invention, can be 10% or less, or 8% or less, or 5% or less, or 4% or less, or 3% or less, or 2% or less, or 1% or less.

Adhesion Control Agents

In addition to the use of a plasticizer as described above, various adhesion control agents ("ACAs") can be used in the poly(vinyl acetal) layers and/or CE layer, and optionally any one or more additional layers. ACAs in the multilayer interlayer formulation control adhesion of the interlayer to glass to provide energy absorption on impact of the glass laminate. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin, the resin being poly(vinyl acetal) and/or CE. Such ACAs, include, but are not limited to, the ACAs disclosed in U.S. Pat. No. 5,728,472 (the entire disclosure of which is incorporated herein by reference), residual sodium acetate, potassium acetate, magnesium bis(2-ethyl butyrate), and/or magnesium bis(2-ethyl hexanoate).

The Structure

The multilayer interlayer of the invention has the following structure:
(A) a first polyvinyl acetal ("poly(vinyl acetal)") layer comprising poly(vinyl acetal) resin; and
(B) one or more cellulose ester ("CE") layers comprising cellulose esters; and
(C) a second poly(vinyl acetal) layer comprising poly(vinyl acetal) resin;
wherein at least one CE layer is disposed between the first and second poly(vinyl acetal) layers.

The thickness, or gauge, of the entire multilayer interlayer can be at least 10 mils, or at least 11 mils, or at least 12 mils, or at least 15 mils, or at least 20 mils, or at least 25 mils, or at least 30 mils, or at least 40 mils, or at least 50 mils, or at least 60 mils, or at least 70 mils, or at least 80 mils. Additionally or in the alternative, the thickness of the entire multilayer interlayer can be up to 2000 mils, or up to 1000 mils, or up to 500 mils, or up to 300 mils, or up to 200 mils, or up to 150 mils, or up to 100 mils, or up to 80 mils, or up to 50 mils. Suitable ranges include 10-2000, or 10-1000, or 10-500, or 10-300, or 10-200, or 10-150, or 10-100, or 10-80, or 10-50, or 11-2000, or 11-1000, or 11-500, or 11-300, or 11-200, or 11-150, or 11-100, or 11-80, or 11-50, or 15-2000, or 15-1000, or 15-500, or 15-300, or 15-200, or 15-150, or 15-100, or 15-80, or 15-50, or 20-2000, or 20-1000, or 20-500, or 20-300, or 20-200, or 20-250, or 20-100, or 20-80, or 20-50, or 25-2000, or 25-1000, or 25-500, or 25-300, or 25-200, or 25-150, or 25-100, or 25-80, or 25-50, or 30-2000, or 30-1000, or 30-500, or 30-100, or 30-300, or 30-200, or 30-150, 30-80, or 30-50, or 40-2000, or 40-1000, or 40-500, or 40-100, or 40-80, or 40-50, or 50-2000, or 50-1000, or 50-500, or 50-100, or 50-80, or 60-2000, or 60-1000, or 60-500, or 60-100, or 60-80, or 70-2000, or 70-1000, or 70-500, or 70-100, or 70-80, or 80-2000, or 80-1000, or 80-500, or 80-300, or 80-200, or 80-150, or 80-100.

The E' modulus of the multilayer interlayer made with a layer of CE between two poly(vinyl acetal) resin interlayers is higher than the same layer structure made only with poly(vinyl acetal) interlayers (without a CE layer). The improvement in the storage E' modulus by the use of CE's can be quite significant. By the use of CE, the storage E' modulus at 60° C. and/or at 80° C. can be improved by at least 50%, or at least 100%, or at least 200%, or at least 300%, or at least 400%, or at least 500%, or even as much as 700% or more, or 800% or more, or 900% or more, or 1000% or more. The increase can be calculate by the equation:

$$\text{Increase \%} = \frac{E' \text{ interlayer with } CE - E' \text{ without } CE \times 100}{E' \text{ without } CE}$$

The E' modulus of the multilayer interlayer structure (poly(vinyl acetal and CE layers) at 60° C. can be at least $1\times10^7$, or at least $3\times10^7$, or at least $5\times10^7$, or at least $6\times10^7$, or at least $8\times10^7$, or at least $1\times10^8$, in each case as pascals.

The E' modulus of the multilayer interlayer structure (poly(vinyl acetal and CE layers) at 80° C. can be at least $1\times10^7$, or at least $1.2\times10^7$, or at least $2\times10^7$, or at least $3\times10^7$, or at least $5\times10^7$, or $1\times10^7$, in each case as pascals. The storage E' modulus of the monolithic interlayer can be measured according to ASTM D5026-06 (Reapproved 2014). The E' modulus is obtained by the Dynamic Mechanical Analysis using the RSA-II instrument. A 9 mm wide and 0.765 mm thick sample is clamped at the top and bottom and placed in tension. The length of the sample between the clamps is 22 mm. A sinusoidal tensile strain of magnitude 0.01% is applied at a frequency of 1 Hz to the specimen over a range of temperatures and the resulting stress response is measured. Modulus which is a measure of resistance of the material to deformation is obtained from the ratio of stress to strain. For an oscillatory tensile deformation, E' is the real part of the complex modulus and is referred to as the storage modulus. Temperature control is provided by an oven chamber and the heating rate is 3° C./minute.

The multilayer interlayer of the invention also can now be used in applications which require maintaining good modulus at higher temperatures, such as outdoor applications that undergo regular intermittent stresses, caused by such factors as walking or running, or that are load bearing under temperature conditions that exceed 35° C. Examples of applications in which the monolithic interlayer of the invention is suited include stairs, outdoor platforms, pavement or sidewalk platforms, single side balcony laminates, canopies, support beams, stairs, handrails, building envelopes, bullet proof glass, bomb blast resistant glass, etc.

The multilayer interlayer can be made by any suitable process known to one of ordinary skill in the art of producing interlayers, and is not limited to a method for its manufacture. For example, it is contemplated that the multilayer interlayers may be formed through melt extrusion. In an extrusion process, a co-extrusion process may be utilized. Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

Alternatively, each layer of the interlayer can be separately extruded into sheets, and the sheet can be laid up to form a laminate structure of the desired order, and then pressed under heat and pressure to form the multilayer interlayer.

The poly(vinyl acetal) layers and CE layers can be in direct contact with each other or can be indirectly disposed adjacent to each other through another layer. Desirably, at least one of the poly(vinyl acetal) layers and at least one of the CE layers are in direct contact with each other. The poly(vinyl acetal) layers and CE layers desirably are also directly bonded to each other. The bond is desirably a heat bond as would occur when the layers are laid up against each other and the multilayer interlayer heated to above the Tg of all layers. This can occur by laying up the layers against each other and heat pressing, or by co-extruding the layers.

The multilayer interlayer can be incorporated into a multiple layer panel. As used herein, a multiple layer panel can comprise a single substrate, such as glass, acrylic, or polycarbonate with the multilayer interlayer disposed thereon, and most commonly, with a polymer film further disposed over the multilayer interlayer. The combination of multilayer interlayer and polymer film is commonly referred to in the art as a bilayer. A typical multiple layer panel with a bilayer construct is: (glass)//(multilayer interlayer)//(polymer film) where the multilayer interlayer can comprise at least 3 interlayers as noted above. The polymer film supplies a smooth, thin, rigid substrate that affords better optical character than that usually obtained with a multilayer interlayer alone and functions as a performance enhancing layer. Polymer films differ from any of the layers in the multilayer interlayers, as used herein, in that polymer films are not poly(vinyl acetal) resins and are not cellulose esters. Generally, the polymer films do not themselves provide the necessary penetration resistance, stiffness, and glass retention properties, but rather provide performance improvements, such as infrared absorption characteristics. Poly(ethylene terephthalate) ("PET") is the most commonly used polymer film. A polymer film is desirably thinner than the CE layer. Suitable polymer film thicknesses can range from about 0.04 mils to 7.9 mils thick, although other thicknesses may be used as desired.

Further, the multiple layer panel can be what is commonly known in the art as a solar panel, with the panel further comprising a photovoltaic cell, as that term is understood by one of ordinary skill in the art, encapsulated by the multilayer interlayer(s). In such instances, the interlayer is often laminated over the photovoltaic cell, with a construct such as: (glass)//(multilayer interlayer)//(photovoltaic cell)//(multilayer interlayer)//(glass or polymer film).

The interlayers of the present disclosure will most commonly be utilized in multiple layer panels comprising two substrates, preferably a pair of glass interlayers, with the interlayers disposed between the two substrates. An example of such a construct would be: (glass)//(multilayer interlayer)//(glass), where the multilayer interlayer can comprise multilayered interlayers as noted above. Further, the multiple layer panel can contain a polymer film, such as (glass)//(multilayer interlayer)//polymer film//(interlayer)//(glass) where the "interlayer" may be any interlayer, including multilayer interlayers. These examples of multiple layer panels are in no way meant to be limiting, as one of ordinary skill in the art would readily recognize that numerous constructs other than those described above could be made with the interlayers of the present disclosure.

Such a glass pane structure comprises a pair of glass substrates, and a multilayer interlayer containing a first poly(vinyl acetal) layer, a CE layer, and a second poly(vinyl acetal) layer. Alternatively, the glass panel may also be a bilayer structure made up of a single glass substrate, the multilayer interlayer and a polymer film wherein the multilayer interlayer is disposed between the glass substrate and the polymer film. The multilayer interlayer in this case contains a CE layer disposed between two poly(vinyl acetal) layers. A first side of the CE layer is in direct contact a side of a first poly(vinyl acetal) layer, and a second side of the CE layer is also in direct contact with a side of the second poly(vinyl acetal) layer. In another embodiment, a polymer film, as previously described, may be included in the structure, wherein the polymer film is disposed in contact with one side of the multilayer interlayer comprising the poly(vinyl acetal) layer and the CE layer, and another interlayer (such as a poly(vinyl acetal) layer) disposed in contact with the other side of the polymer film.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 50° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 150 psig and 200 psig for about 30 to 90 minutes.

Other means for use in de-airing of the interlayer-glass interfaces (steps 2 to 5) known in the art and that are commercially practiced include vacuum bag and vacuum ring processes in which a vacuum is utilized to remove the air.

An alternate lamination process involves the use of a vacuum laminator that first de-airs the assembly and subsequently finishes the laminate at a sufficiently high temperature and vacuum.

EXAMPLES

Example 1

Pellets of extrusion grade Tenite CAP-482-20 containing 15% TEG-EH plasticizer and a high temperature stabilizer were used to press sheets of approximately 0.030 inch (30 mils) thickness using a steam press.

The CAP sheets were used to make glass laminates with a trilayer A/B/C interlayer structure having PVB sheets in the A and C positions and the pressed CAP sheets in the B position.

The types of PVB layers employed are commercially available from Solutia, Inc. under the tradenames identified in Table 3, which set forth the types of multilayer interlayers made.

| Examples | "A" Sheet | "B" Sheet | "C" Sheet |
|---|---|---|---|
| 1 | DG41 | CAP | DG41 |
| 2 | RB11 | CAP | RB11 |
| 3 | RB41 | CAP | RB41 |

| Examples | "A" Sheet | "B" Sheet | "C" Sheet |
|---|---|---|---|
| 4 | DG41 | DG41 | None |
| 5 | DG41 | None | None |

Glass panels were made using each multilayer interlayer Examples 1-3. After aging the glass panels, they exhibited excellent optical clarity.

The invention claimed is:

1. A multilayer interlayer comprising at least one cellulose ester layer comprising a cellulose ester, wherein said cellulose ester has a hydroxyl content of 0.5-30 weight percent based on the weight of the cellulose ester; wherein said cellulose ester is a mixed cellulose ester comprising at least two different acyl groups; wherein said cellulose ester layer has a Tg of at least 50° C. and not more than 250° C.; and a poly(vinyl acetal) layer comprising at least one poly(vinyl acetal) resin.

2. The multilayer interlayer of claim 1, wherein said cellulose ester exhibits a glass transition temperature ("Tg") of at least 55° C. and not more than 250° C.

3. The multilayer interlayer of claim 1, wherein said cellulose ester layer comprises a plasticizer.

4. The multilayer interlayer of claim 1, wherein said cellulose ester comprises a mixed cellulose ester having an acetyl content in the range of 0 to 25 weight percent based on the total weight of the cellulose ester.

5. A multilayer interlayer comprising:
   (a) a poly(vinyl acetal) layer comprising at least one poly(vinyl acetal) resin, wherein said poly(vinyl acetal) resin has a residual hydroxyl content in the range of 6 to 35 weight percent as measured according to ASTM D1396, a plasticizer, and a glass transition temperature ("Tg") in the range of −20 to 65° C.; and
   (b) a cellulose ester layer comprising at least one cellulose ester; wherein said cellulose ester exhibits a Tg of at least 60° C. and not more than 250° C.

6. The multilayer interlayer of claim 5, wherein said cellulose ester is a mixed cellulose ester comprising at least two different acyl groups.

7. The multilayer interlayer of claim 5, wherein said poly(vinyl acetal) resin has a Tg of at least 0° C.

8. The multilayer interlayer of claim 5, wherein said cellulose ester has a hydroxyl content in the range of 0.5 to 10 weight percent based on the weight of the cellulose ester.

9. The multilayer interlayer of claim 5, wherein said cellulose ester has a Total DS in the range of 1.5 to 3.0.

* * * * *